(12) United States Patent
Galasso

(10) Patent No.: US 12,127,533 B1
(45) Date of Patent: Oct. 29, 2024

(54) MAGNETIC BRAKING AND SPRING RETRACTION ASSEMBLY

(71) Applicant: Giovanni Joseph Galasso, San Ramon, CA (US)

(72) Inventor: Giovanni Joseph Galasso, San Ramon, CA (US)

(*) Notice: Subject to any disclaimer, the term of this patent is extended or adjusted under 35 U.S.C. 154(b) by 216 days.

(21) Appl. No.: 17/547,593

(22) Filed: Dec. 10, 2021

Related U.S. Application Data

(60) Provisional application No. 63/124,095, filed on Dec. 11, 2020.

(51) Int. Cl.
*A01K 27/00* (2006.01)
*H02K 49/10* (2006.01)

(52) U.S. Cl.
CPC ............ *A01K 27/004* (2013.01); *H02K 49/10* (2013.01)

(58) Field of Classification Search
CPC ..... A01K 27/004; F16H 1/28; A63B 21/0051; A63B 21/00192; A63B 21/153
USPC ........................................................ 188/267
See application file for complete search history.

(56) References Cited

U.S. PATENT DOCUMENTS

| | | | |
|---|---|---|---|
| 6,837,830 B2 * | 1/2005 | Eldridge .............. | A63B 23/047 482/54 |
| 9,700,753 B1 * | 7/2017 | Boatwright ........ | A63B 24/0062 |
| 9,731,157 B2 * | 8/2017 | Loach ................ | A63B 21/0053 |
| 9,848,583 B2 * | 12/2017 | Smith .................. | A01K 27/004 |
| 10,143,880 B1 * | 12/2018 | Boatwright .......... | A63B 21/078 |
| 11,179,590 B1 * | 11/2021 | Nicholas ............ | A63B 21/0051 |

FOREIGN PATENT DOCUMENTS

| | | | | |
|---|---|---|---|---|
| DE | 102005025678 A1 * | 1/2006 | ............... | F16H 3/54 |
| DE | 102013013463 A1 * | 2/2015 | ............ | A01K 27/004 |
| FR | 2770747 A3 * | 5/1999 | ............ | A01K 27/004 |
| GB | 2327621 A * | 2/1999 | ......... | A63B 21/0051 |
| JP | H10313749 A * | 12/1998 | | |
| WO | WO-2017098275 A1 * | 6/2017 | ........... | A01K 27/004 |

* cited by examiner

Primary Examiner — Sherry L Estremsky
(74) Attorney, Agent, or Firm — Adibi IP Group, PC; Amir V. Adibi; Andrew C. Palmer

(57) ABSTRACT

A magnetic braking and spring retraction assembly comprises a spool, a one way bearing, a leash, a rod, a planetary carrier, a plurality of planetary gears, a sun gear, a ring gear, a magnetic disc, and an enclosure. An end of the leash is attached to the spool and wraps around the spool. The magnetic braking and spring retraction assembly operates in one of two modes that include a magnetic braking mode and a spring retracting mode. In the magnetic braking mode, the spool rotates in a first direction thereby causing the leash to extend away from the assembly. In the spring retracting mode, the spool rotates in a second direction and the leash is drawn towards the assembly. In one of the magnetic braking and spring retracting modes the one way bearing locks and in another of the magnetic braking and spring retracting modes the one way bearing freewheels.

14 Claims, 24 Drawing Sheets

LEASH OUT (MAGNETIC BRAKING)

LEASH IN (SPRING RETRACTION)

TABLE 530

| MAGNETIC BRAKING AND SPRING RETRACTION ASSEMBLY | | | |
|---|---|---|---|
| COMPONENT | FIRST OPERATING MODE | SECOND OPERATING MODE | THIRD OPERATING MODE |
| MAGNETIC BRAKING AND SPRING RETRACTION ASSEMBLY | MAGNETIC BRAKING SIDE ENGAGED | MAGNETIC BRAKING SIDE DISENGAGED | MAGNETIC BRAKING SIDE DISENGAGED |
| BUTTON | NOT PRESSED (OR NO BUTTON) | NOT PRESSED OR PRESSED* | PRESSED |
| LEASH | EXTENDING | RETRACTING | STATIC (IF EXTENDING) |
| SPOOL | CCW (VIA LEASH) [MAGNETIC BRAKING MODE] | CW (VIA RETRACTABLE SPRING) [SPRING RETRACTING MODE] | STATIC (NOT ROTATING) [LOCKED MODE] |
| RETRACTABLE SPRING | COMPRESSING | DECOMPRESSING | STATIC (NOT ROTATING) |
| ONE WAY BEARING | CCW (LOCKED) | CW (FREE WHEELING) | STATIC (LOCKED) |
| SUPPORT ROD | CCW (VIA FIRST ONE WAY BEARING) | STATIC (NOT ROTATING) | STATIC (NOT ROTATING) |
| PLANETARY CARRIER | CCW (1:1 RATIO WITH SPOOL) | STATIC (NOT ROTATING) | STATIC (NOT ROTATING) |
| PLANETARY GEARS | REVOLVING CCW AROUND SUN GEAR (VIA PLANETARY CARRIER) | STATIC (NOT ROTATING) | STATIC (NOT ROTATING) |
| RING GEAR | STATIC (COUPLED TO ENCLOSURE) | STATIC (COUPLED TO ENCLOSURE) | STATIC (COUPLED TO ENCLOSURE) |
| SUN GEAR | CCW (VIA PLANETARY GEARS) | STATIC (NOT ROTATING) | STATIC (NOT ROTATING) |
| MAGNETIC DISC | CCW (VIA SUN GEAR) | STATIC (NOT ROTATING OR COUPLED TO ENCLOSURE*) | STATIC (COUPLED TO ENCLOSURE) |
| METAL DISC** | STATIC (COUPLED TO ENCLOSURE) | STATIC (COUPLED TO ENCLOSURE) | STATIC (COUPLED TO ENCLOSURE) |

\* IN THE SECOND OPERATING MODE, THE MAGNETIC DISC IS STATIC REGARDLESS IF THE BUTTON IS NOT PRESSED (NOT ROTATING) OR PRESSED (COUPLED TO ENCLOSURE).

\*\* METAL DISC IS NOT REQUIRED WHEN ENCLOSURE IS MADE OF METAL (SEE FIG. 12)

FIG. 13

TABLE 560

| COMPONENT | FIRST OPERATING MODE | SECOND OPERATING MODE | THIRD OPERATING MODE | FOURTH (SECOND) OPERATING MODE |
|---|---|---|---|---|
| MAGNETIC BRAKING AND SPRING RETRACTION ASSEMBLY | MAGNETIC BRAKING SIDE ENGAGED | MAGNETIC BRAKING SIDE DISENGAGED | MAGNETIC BRAKING SIDE ENGAGED (LIMITED) | MAGNETIC BRAKING SIDE DISENGAGED |
| BUTTON | NOT PRESSED (OR NO BUTTON) | NOT PRESSED (OR NO BUTTON) | PRESSED | PRESSED |
| LEASH | EXTENDING | RETRACTING | EXTENDING (LIMITED VIA COILED SPRING) | RETRACTING |
| SPOOL | CCW (VIA LEASH) [MAGNETIC BRAKING MODE] | CW (VIA RETRACTING SPRING) [SPRING RETRACTING MODE] | CCW (VIA LEASH) (LIMITED VIA COILED SPRING) | CW (VIA COILED SPRING AND RETRACTING SPRING) [SPRING RETRACTING MODE] |
| RETRACTABLE SPRING | COMPRESSING | DECOMPRESSING | COMPRESSING | DECOMPRESSING |
| ONE WAY BEARING | CW (LOCKED) | CCW (FREE WHEELING) | STATIC (NOT FREE WHEELING) | FREE WHEELING |
| SUPPORT ROD | STATIC (NOT ROTATING) | STATIC (NOT ROTATING) | STATIC (NOT ROTATING) | STATIC (NOT ROTATING) |
| RING GEAR | CCW (COUPLED TO SPOOL) | CW (COUPLED TO SPOOL) | CCW (COUPLED TO SPOOL) | CW (COUPLED TO SPOOL) |
| PLANETARY CARRIER | STATIC (NOT ROTATING) | STATIC (NOT ROTATING) | CCW (VIA PLANETARY GEARS) | CW (VIA FIRST SHAFT) (STATIC AFTER COILED SPRING DECOMPRESSES) |
| PLANETARY GEARS | EACH GEAR - CCW (GEARS NOT REVOLVING AROUND SUN GEAR) | EACH GEAR - CW (GEARS NOT REVOLVING AROUND SUN GEAR) | REVOLVING CCW AROUND SUN GEAR (VIA RING GEAR) | REVOLVING CW AROUND SUN GEAR |
| SUN GEAR | CW (VIA PLANETARY GEARS) | CCW (VIA PLANETARY GEARS) | STATIC (NOT ROTATING) | CCW (VIA PLANETARY GEARS) |
| MAGNETIC DISC | CCW (VIA SECOND SHAFT) | STATIC (NOT ROTATING) | STATIC (COUPLED TO ENCLOSURE) | STATIC (COUPLED TO ENCLOSURE) |
| METAL DISC** | STATIC (COUPLED TO ENCLOSURE) | STATIC (COUPLED TO ENCLOSURE) | STATIC (COUPLED TO ENCLOSURE) | STATIC (COUPLED TO ENCLOSURE) |
| THIRD SHAFT | STATIC (NOT ROTATING) | STATIC (NOT ROTATING) | CCW (RATE DEPENDS ON GEAR RATIO) | CW (RATE DEPENDS ON GEAR RATIO) |
| COVER | CCW (COUPLED TO SPOOL) | CW (COUPLED TO SPOOL) | CCW (COUPLED TO SPOOL) | CW (COUPLED TO SPOOL) |
| COILED SPRING | STATIC (NOT ROTATING) | STATIC (NOT ROTATING) | COMPRESSING | DECOMPRESSING |

* IN THE SECOND OPERATING MODE, THE MAGNETIC DISC IS STATIC WHEN THE BUTTON IS NOT PRESSED (NOT ROTATING) OR PRESSED (COUPLED TO ENCLOSURE).

** METAL DISC IS NOT REQUIRED WHEN ENCLOSURE IS MADE OF METAL.

FIG. 26

MAGNETIC BRAKING AND SPRING RETRACTION ASSEMBLY

CROSS REFERENCE TO RELATED APPLICATIONS

This application claims the benefit under 35 U.S.C. § 119 of U.S. provisional patent application Ser. No. 63/124,095, entitled "Magnetic Braking And Spring Retraction Assembly," filed on Dec. 11, 2020. The subject matter of the foregoing document is expressly incorporated herein by reference.

TECHNICAL FIELD

The present invention relates generally to pet leashes, and more particularly to retractable leash assemblies.

BACKGROUND INFORMATION

A retractable leash device is a common type of leash utilized by pet owners to walk their canines. The retractable leash device typically includes a housing or enclosure with a handle and a leash wound around an internal spool. As the spool rotates in one direction, the leash unravels from the spool and extends away from the spool. As the spool rotates in an opposite direction, the spool is tensioned causing the leash to retract back into the device and wrap around the spool. The retractable leash device tends to minimize slack between the owner and pet thereby preventing extra slack getting caught on objects, getting tangled, or causing other pets or individuals to trip over the extra slack.

SUMMARY

A magnetic braking and spring retraction assembly comprises a spool, a one way bearing, a leash, a rod, a planetary carrier, a plurality of planetary gears, a sun gear, a ring gear, a metal disc, a magnetic disc, and an enclosure. The leash is attached to and wraps around the spool. The magnetic braking and spring retraction assembly operates in one of two modes that include a magnetic braking mode and a spring retracting mode. In the magnetic braking mode, the spool rotates in a first direction (clockwise or counter-clockwise) thereby causing the leash to extend away from the assembly. In the spring retracting mode, the spool rotates in a second direction (counter-clockwise or clockwise) and the leash is drawn towards the assembly. In one of the magnetic braking and spring retracting modes the one way bearing locks, and in another of the magnetic braking and spring retracting modes the one way bearing freewheels.

In one embodiment, the magnetic braking and spring retraction assembly is provided to a user having a pet canine. An end of the leash is attached to the spool and another end of the leash is attached to the canine's collar. When the canine moves away from the magnetic braking and spring retraction assembly, the leash unravels from the spool and extends away and out of the assembly. Rotation of the spool causes the magnetic braking mode to be engaged. During the magnetic braking mode the leash is gradually tensioned. As the canine accelerates, the leash is withdrawn more rapidly causing the spool to rotate at a higher rate. The magnetic braking mode applies greater tension on the spool as the spool rotates at this higher rate. This causes the canine to experience greater tension as the canine travels away from the assembly, and even greater tension if the canine is traveling away from the assembly at a faster rate.

When the canine stops moving away from the magnetic braking and spring retraction assembly or moves toward the assembly, the spring retraction mode is enabled. In the spring retraction mode, the spool is tensioned to rotate in a direction opposite the direction in the magnetic braking mode. During the spring retraction mode, the leash is drawn towards the spool causing the leash to wrap around the spool. This causes slack to be minimized or removed between the user and the canine.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 13 is a table 530 that illustrates various methods of operating a magnetic braking and spring retracting assembly.

FIG. 26 is a table 530 in accordance with one novel aspect.

DETAILED DESCRIPTION

Reference will now be made in detail to some embodiments of the invention, examples of which are illustrated in the accompanying drawings.

In the description and claims, terms such as "Clockwise (CW)", "Counterclockwise (CCW)", "top", "bottom", "front", "back", and "side" are used to describe relative directions and orientations between different parts of the magnetic braking and spring retraction assembly, and it is to be understood that the overall structure being described can actually be oriented in any way in three-dimensional space. For example, when a first object is described as rotating counterclockwise, it is to be understood that the first object may in fact be rotating clockwise when viewed from a different perspective.

Figure 1:
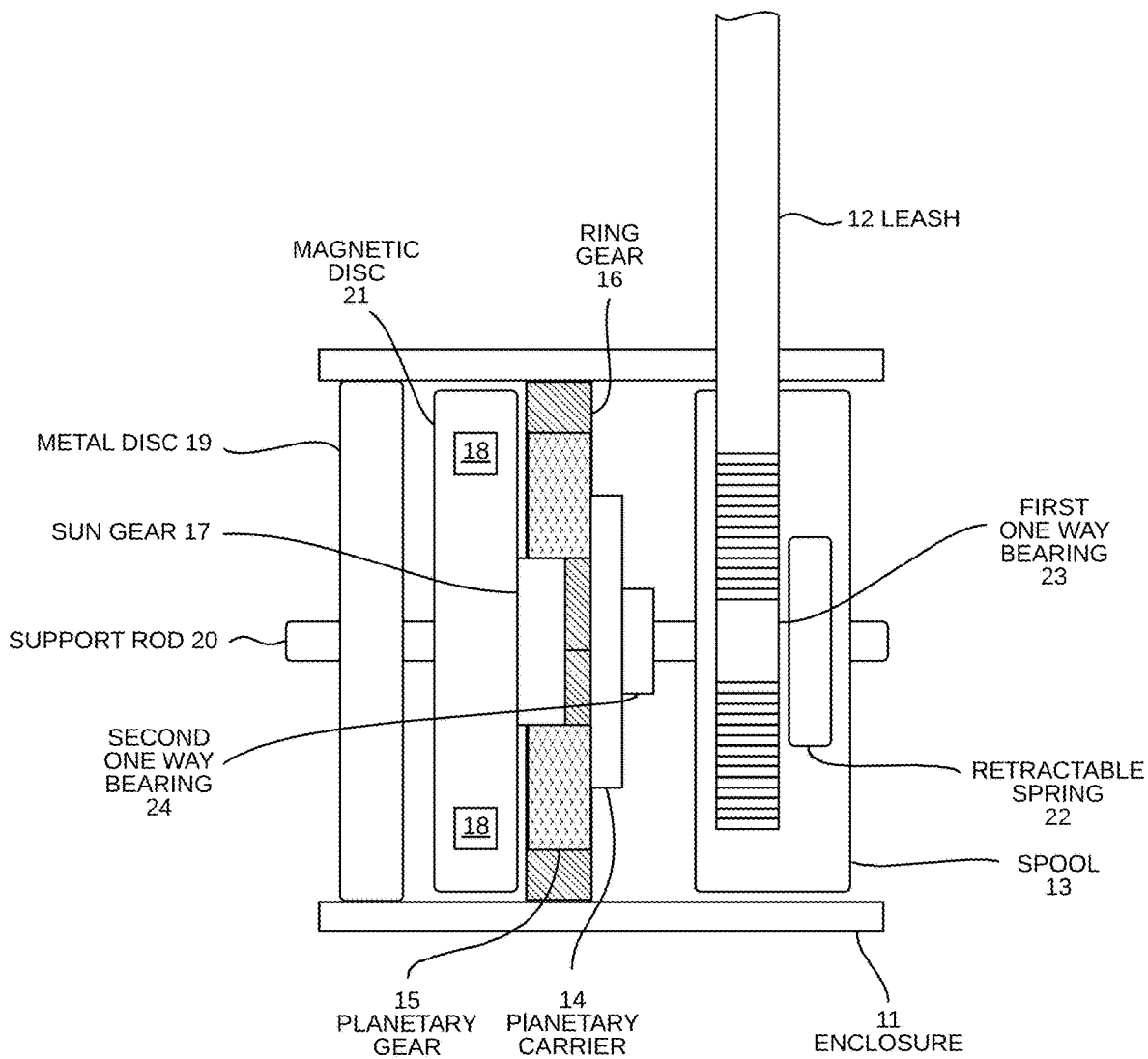
FIG. 1 is a cross-sectional diagram of a magnetic braking and spring retraction assembly 10.

FIG. 1 is a cross-sectional diagram of a magnetic braking and spring retraction assembly 10. In this embodiment, assembly 10 includes an enclosure 11, a leash 12 attached to a spool 13 with a retractable spring 22, a planetary carrier 14 coupled to planetary gears 15, a ring gear 16, a sun gear 17, a magnetic disc 21 including magnets 18, a metal disc 19, and a support rod 20. In this embodiment, ends of a support rod 20 are coupled to the enclosure 11 via washers (see FIGS. 5-7). Coupling the support rod 20 to the enclosure 11 prevents the support rod 20 from moving laterally while still allowing the support rod 20 to rotate radially. The addition of washers reduces damage caused to the enclosure 11 due to the rotating support rod 20.

In another embodiment, ends of the support rod 20 are coupled to the enclosure 11 such that the support rod 20 does not move or rotate.

In the embodiment shown in FIG. 1, the retractable spring 22, sun gear 17, metal disc 19, and magnetic disc 21 are each coupled to the support rod 20 via a freewheeling bearing. A freewheeling bearing is a bearing that does not lock when rotating in a clockwise or counterclockwise direction (e.g. nylon washer).

In another example, the metal disc 19 contains a hole with a diameter slightly larger than an outer diameter of the support rod 20 and does not require a freewheeling bearing.

In this embodiment, the metal disc 19 is made from a magnetically attractive material (e.g. aluminum) and is coupled to enclosure 11. The metal disc 19 is static and does not rotate, but allows for radial rotation of the support rod 20.

In another embodiment, the magnetic braking and spring retraction assembly 10 is provided without the metal disc 19. In the example without metal disc 19, the enclosure 11 is made of a magnetically attractive material (e.g. aluminum) and can generate eddy currents with the magnetic disc 21. An example of an enclosure of a magnetic braking and retraction assembly without a metal disc is described in detailed description for the embodiment in FIG. 12.

One novel aspect of a magnetic braking and retraction assembly is its inclusion of a bearing that locks in one direction (one way bearing). A one way bearing locks when rotating in one direction (e.g. counterclockwise) and freewheels when rotating in the opposite direction (e.g. counterclockwise). For example, the embodiment of FIG. 1 shows the spool 13 coupled to the support rod 20 via a first one way bearing 23. FIG. 1 also shows the planetary carrier 14 coupled to the support rod 20 via a second one way bearing 24. The first one way bearing 23 and the second one way bearing 24 each lock to support rod 20 when rotating in the counterclockwise direction.

However, a magnetic braking and spring retraction assembly is able to operate with only a single one way bearing. In another embodiment, the magnetic braking and spring retraction assembly 10 provided includes the first one way bearing 23 but does not include the second one way bearing 24 because the planetary carrier 14 is coupled directly to the support rod 20. (See FIGS. 11 and 12). In yet another example, a magnetic braking and spring retraction assembly includes the second one way bearing 24 but does not include the first one way bearing 23 because the spool 13 is coupled directly to the support rod 20. A more in-depth explanation regarding the operative components of assembly 10 is described in the detailed description below.

Figure 2:
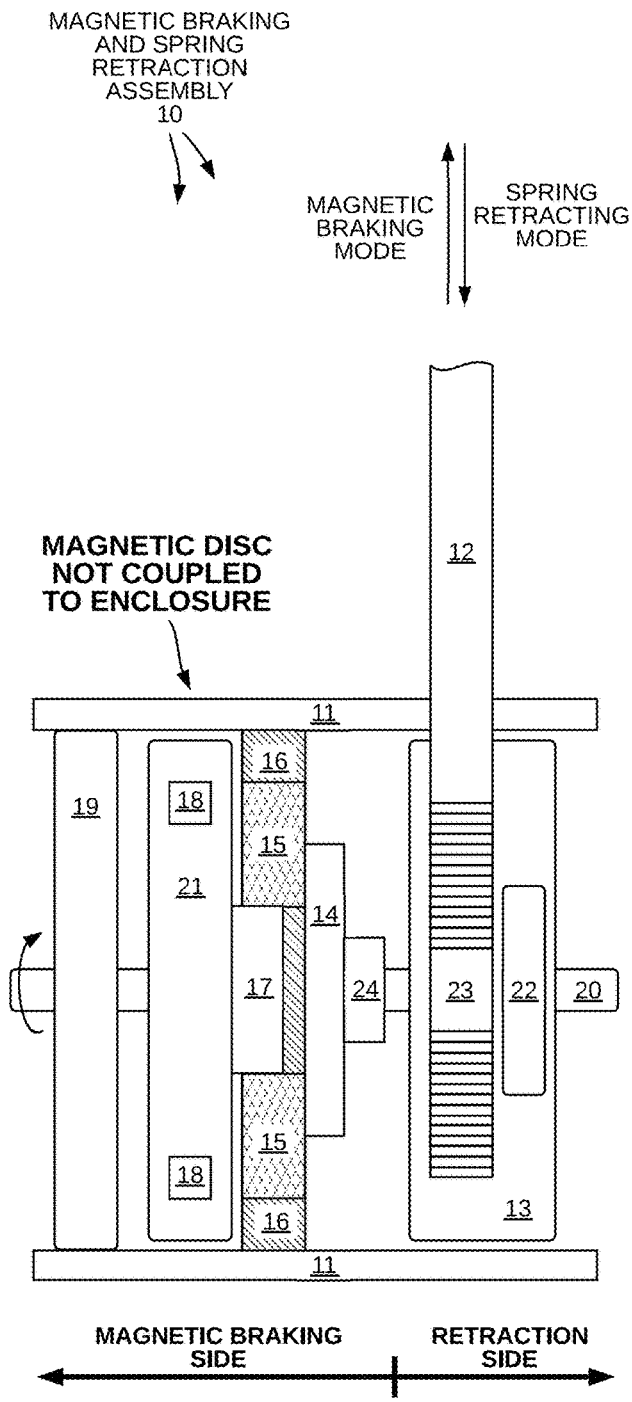
FIG. 2 is a diagram of the magnetic braking and spring retraction assembly 10 and a corresponding table 500.

FIG. 2 is a diagram of the magnetic braking and spring retraction assembly 10 and a corresponding table 500. Table 500 illustrates one method of operating the assembly 10. FIG. 2 shows that the magnetic disc 21 is not coupled to the enclosure 11. When the magnetic disc 21 is not coupled to the enclosure 11 assembly 10 is operable in a first operating mode and a second operating mode. In the first operating mode, the spool 13 is operable in a magnetic braking mode. In the second operating mode, the spool 13 is operable in a spring retracting mode.

When the spool 13 is operable in the magnetic braking mode, pulling or extending the leash 12 applies rotational force on the spool 13, causing the spool 13 to rotate in a counterclockwise direction. Additionally, pulling or extending the leash 12 causes the retractable spring 22 to compress. In the magnetic braking mode, the first one way bearing 23 locks to and drives support rod 20 in a counterclockwise direction. The support rod 20 rotating in counterclockwise direction causes the second one way bearing 24 to lock to the support rod 20. The second one way bearing 24 is coupled to and drives the planetary carrier 14 in a counterclockwise direction.

In another embodiment, the magnetic braking and spring retraction assembly 10 is provided without the second one way bearing 24. In the example without the second one way bearing 24, the planetary carrier 14 is fixed to the support rod 20. When the support rod 20 is rotated in the counterclockwise direction, the planetary carrier 14 rotates in a counterclockwise direction.

In yet another embodiment, the magnetic braking and spring retraction assembly 10 is provided without the first one way bearing 23. In the example without the first one way bearing 23, the spool 13 is fixed to the support rod 20. When the spool 13 rotates in the counterclockwise direction, the support rod 20 rotates in a counterclockwise direction.

In the example of FIG. 2, the planetary carrier 14 is coupled to three equally spaced planetary gears 15 (planet gears). In the magnetic braking mode the planetary carrier 14 rotates in a counterclockwise direction, driving the planetary gears 15 along the ring gear 16 in a counterclockwise direction. In other words, the planetary gears 15 revolve in a counterclockwise direction around the sun gear 17. The ring gear 16 is static (no rotational speed) due to being coupled to the enclosure 11. The planetary gears 15 cause the sun gear 17 to rotate in a counterclockwise direction.

In the example of FIG. 2, the sun gear 17 is coupled to the magnetic disc 21. In the magnetic braking mode, the sun gear 17 and magnetic disc 21 rotate in a counterclockwise direction. The static metal disc 19 exerts a drag force (magnetic braking force) on each of the magnets 18 moving with the rotating magnetic disc 21.

When the spool 13 is operable in the spring retracting mode, the retractable spring 22 decompresses and applies rotational force on the spool 13. The spool 13 rotates in a clockwise direction allowing the leash 12 to retract. In the spring retracting mode, the first one way bearing 23 freewheels and does not lock to the support rod 20. As a result, the support rod 20 is static and is not driven by the first one way bearing 23 while the spool 13 operates in the spring retracting mode. Additionally, the second one way bearing 24, planetary carrier 14, planetary gears 15, ring gear 16, sun gear 17, metal disc 19, and magnetic disc 21 are each static and not rotating. In other words, the magnetic braking side of the assembly 10 is disengaged and no magnetic braking force is generated when the leash 12 is retracting.

Figure 3:
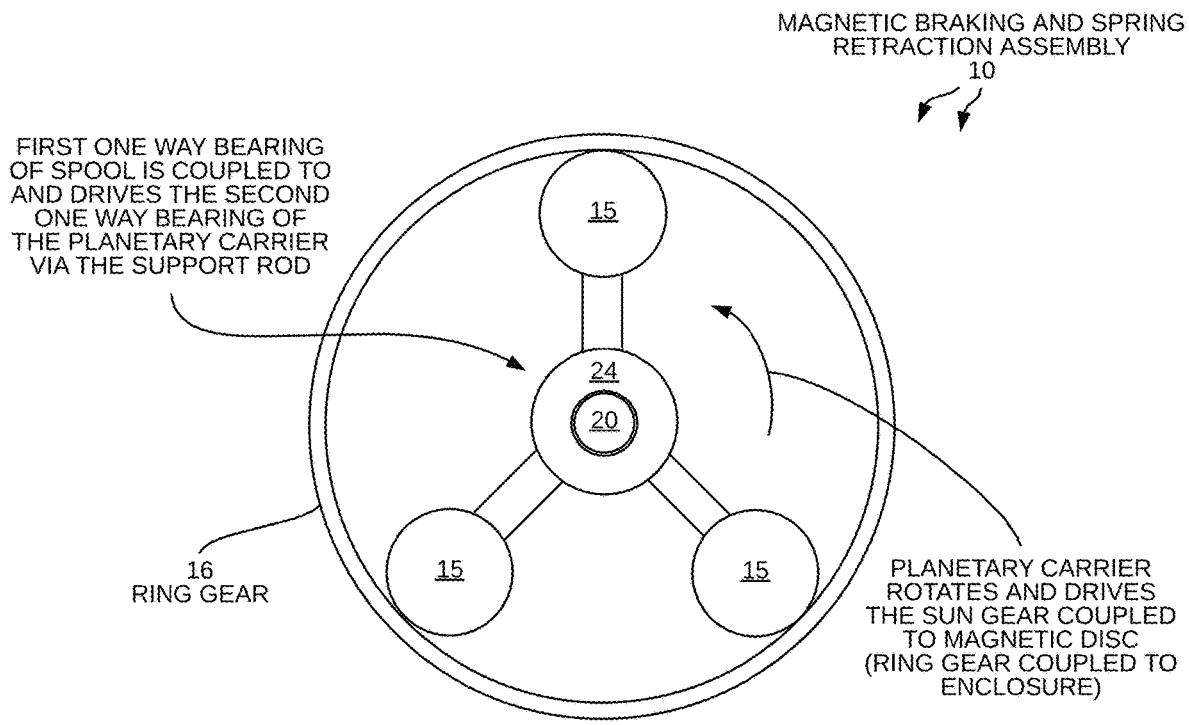
FIG. 3 is an exemplary diagram of the planetary carrier 14 of assembly 10 in the first operating mode with the spool 13 operable in the magnetic braking mode.

FIG. 3 is an exemplary diagram of the planetary carrier 14 of assembly 10 when the spool 13 is operable in the magnetic braking mode. In other words, the leash 12 is extending away from the assembly 10. In this example, the magnetic disc 21 is not coupled to the enclosure 11. As the spool 13 rotates in a counterclockwise direction, the first one way bearing 23 drives the support rod 20. The second one way bearing 24 locks to the support rod 20 when the support rod 20 rotates in a counterclockwise direction. The second one way bearing 24 is coupled to the planetary carrier 14. As the planetary carrier 14 rotates in the counterclockwise direction, the planetary gears 15 move along the ring gear 16 in a counterclockwise direction. Although not shown, the planetary gears 15 drive the sun gear 17 in a counterclockwise direction. The sun gear 17 is coupled to the magnetic disc and creates the magnetic braking force as explained in FIG. 2.

Figure 4:
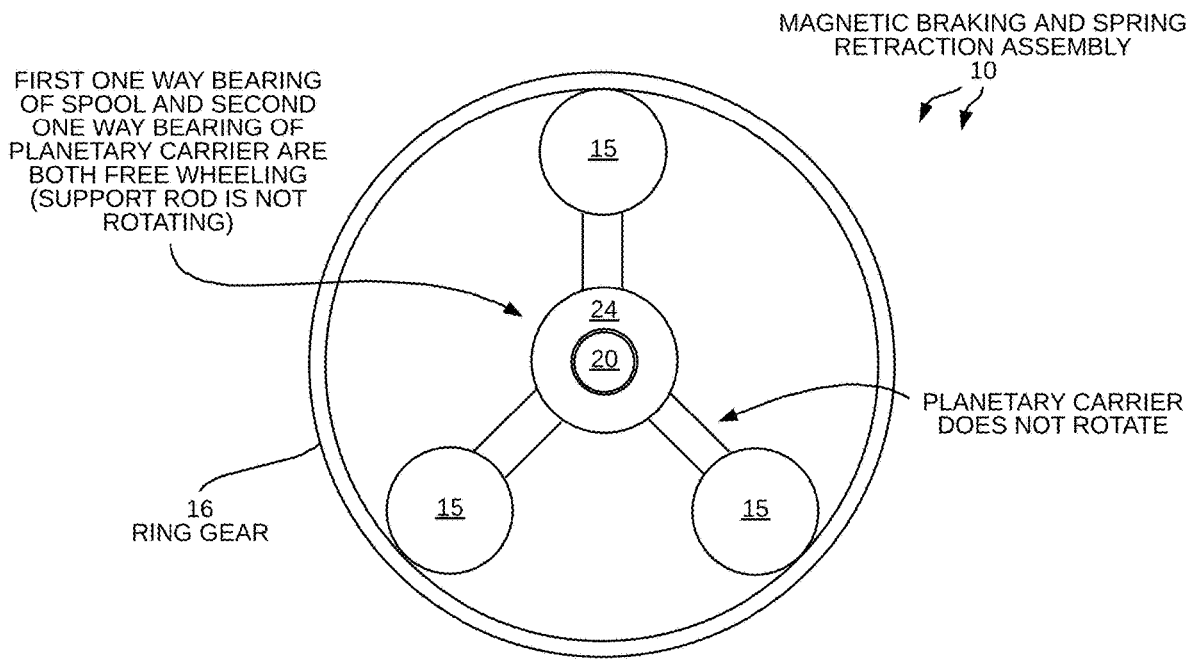
FIG. 4 is an exemplary diagram of the planetary carrier 14 of assembly 10 in the second operating mode with the spool 13 operable in the spring retracting mode.

FIG. 4 is an exemplary diagram of the planetary carrier 14 of assembly 10 in the second operating mode with the spool 13 operable in the spring retracting mode. As the spool 13 rotates in a clockwise direction, the first one way bearing 23 freewheels and does not lock to the support rod 20. The support rod 20 is static and is not being driven by the first one way bearing 23. As a result, the second one way bearing 24, planetary carrier, planetary gears 15, sun gear, and magnetic disc are static (no rotation). In other words, the magnetic braking mode is disengaged, and no magnetic braking occurs.

Figure 5:
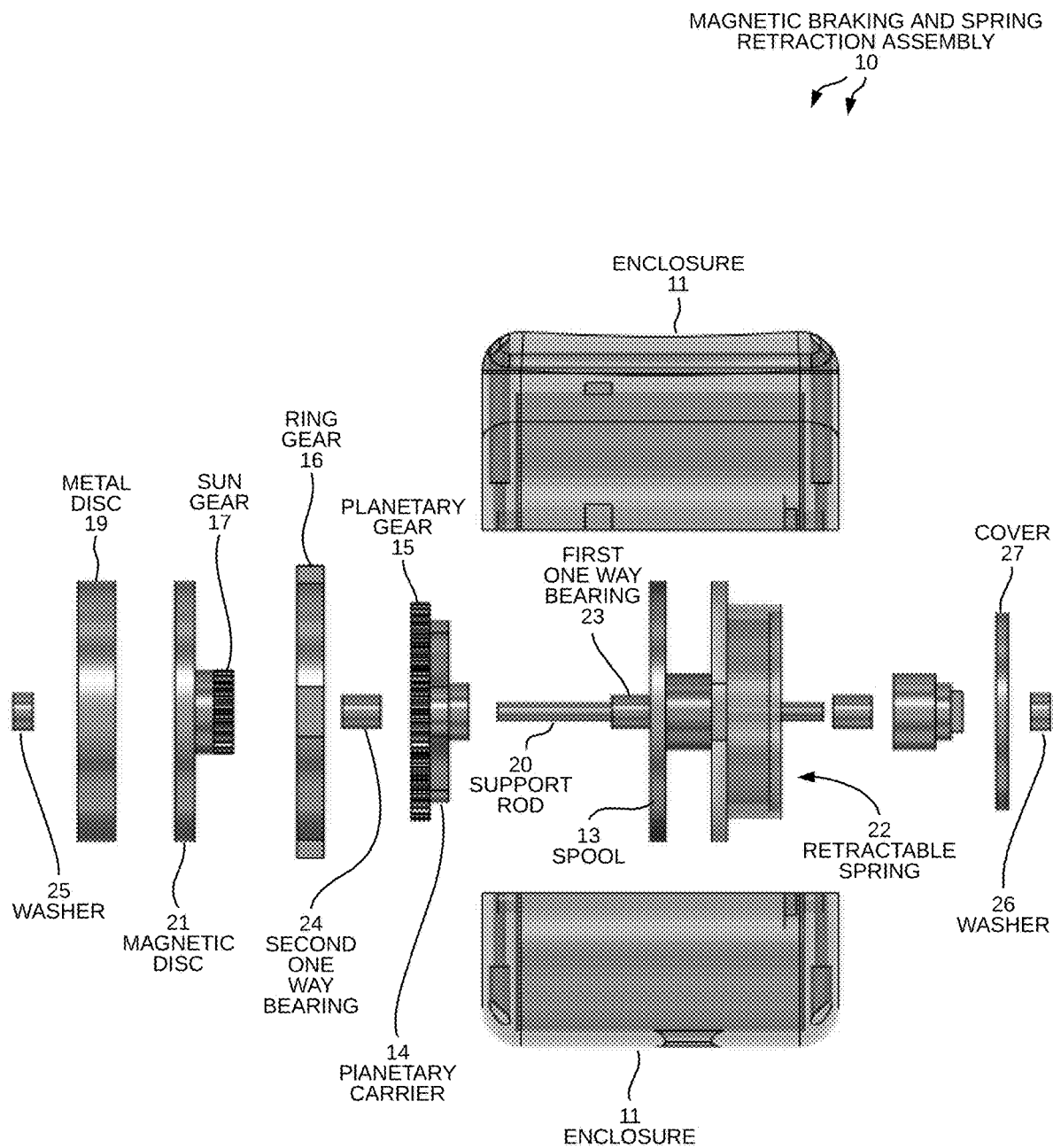
FIG. 5 shows an exploded view of another embodiment of a magnetic braking and spring retraction assembly.

FIG. 5 shows an exploded view of the magnetic braking and spring retraction assembly 10. FIG. 5 shows an exemplary way of how the components of assembly 10 would be assembled. In this example, enclosure 11 has two portions that are secured together via fasteners. FIG. 5 also shows that all of the rotating components (e.g. spool 13) of the assembly 10 conveniently fit inside of the enclosure 11. The enclosure 11 provides a stable housing for the moving parts, which reduces the risk of injury in the event of a malfunction. Certain components such as washers 25-26 and cover 27 help protect key components from derailing or being damaged. For example, cover 27 is coupled to the spool 13 protects retractable spring 22.

In one embodiment, components of assembly 10 are made of metal. For example, FIG. 5 shows enclosure 11, spool 13, planetary carrier 14, planetary gear 15, ring gear 16, sun gear 17, metal disc 19, support rod 20, magnetic disc 21 (with magnets 18), retractable spring 22, first one way bearing 23, second one way bearing 24, washers 25-26, and cover 27 all made of metal material. In this example, aluminium is used to fabricate the components, which is relatively inexpensive and provides a more robust assembly 10.

Figure 6:
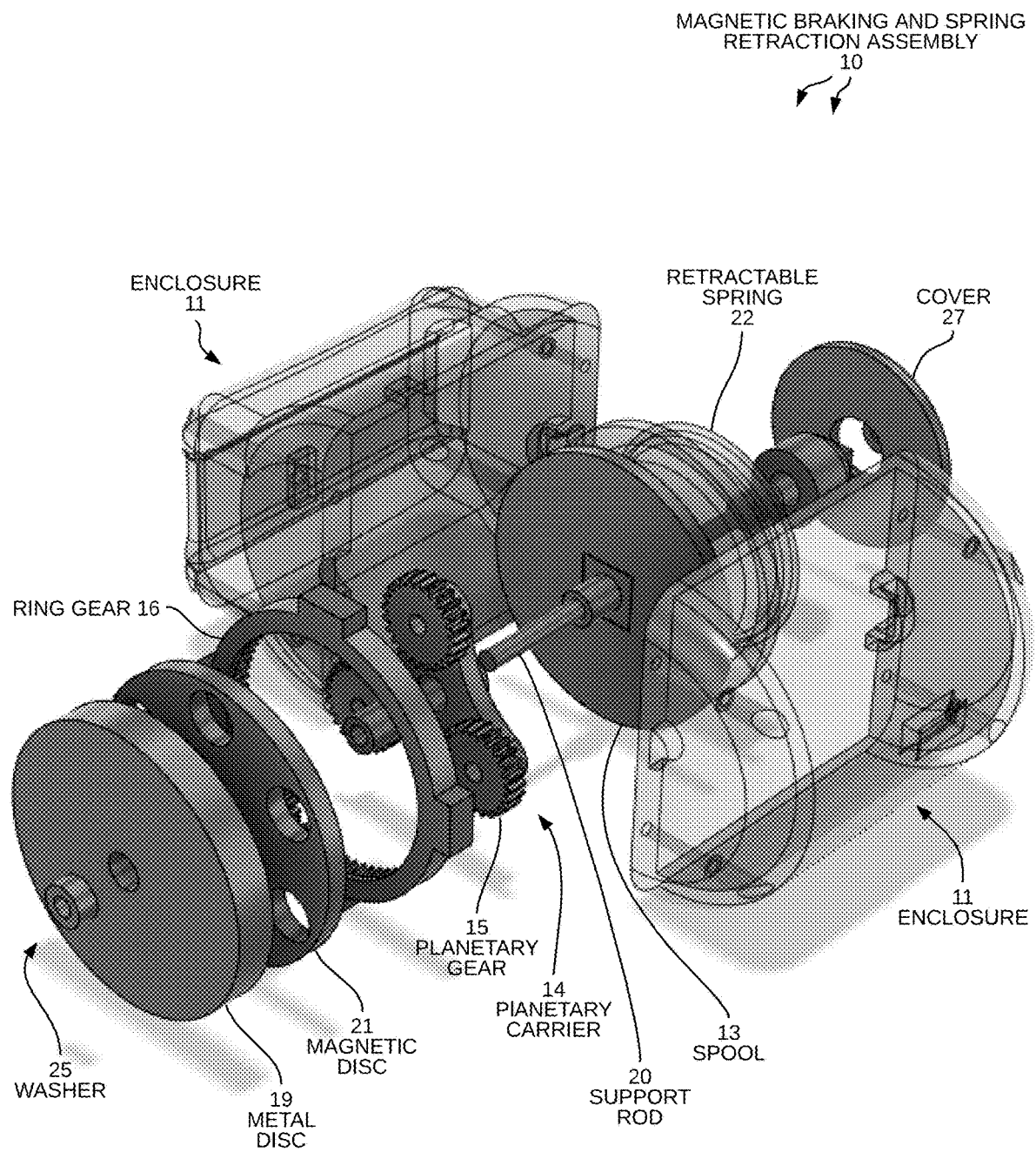
FIG. 6 is a diagram of a perspective exploded view of an exemplary magnetic braking and spring retraction assembly 10.
Figure 7:
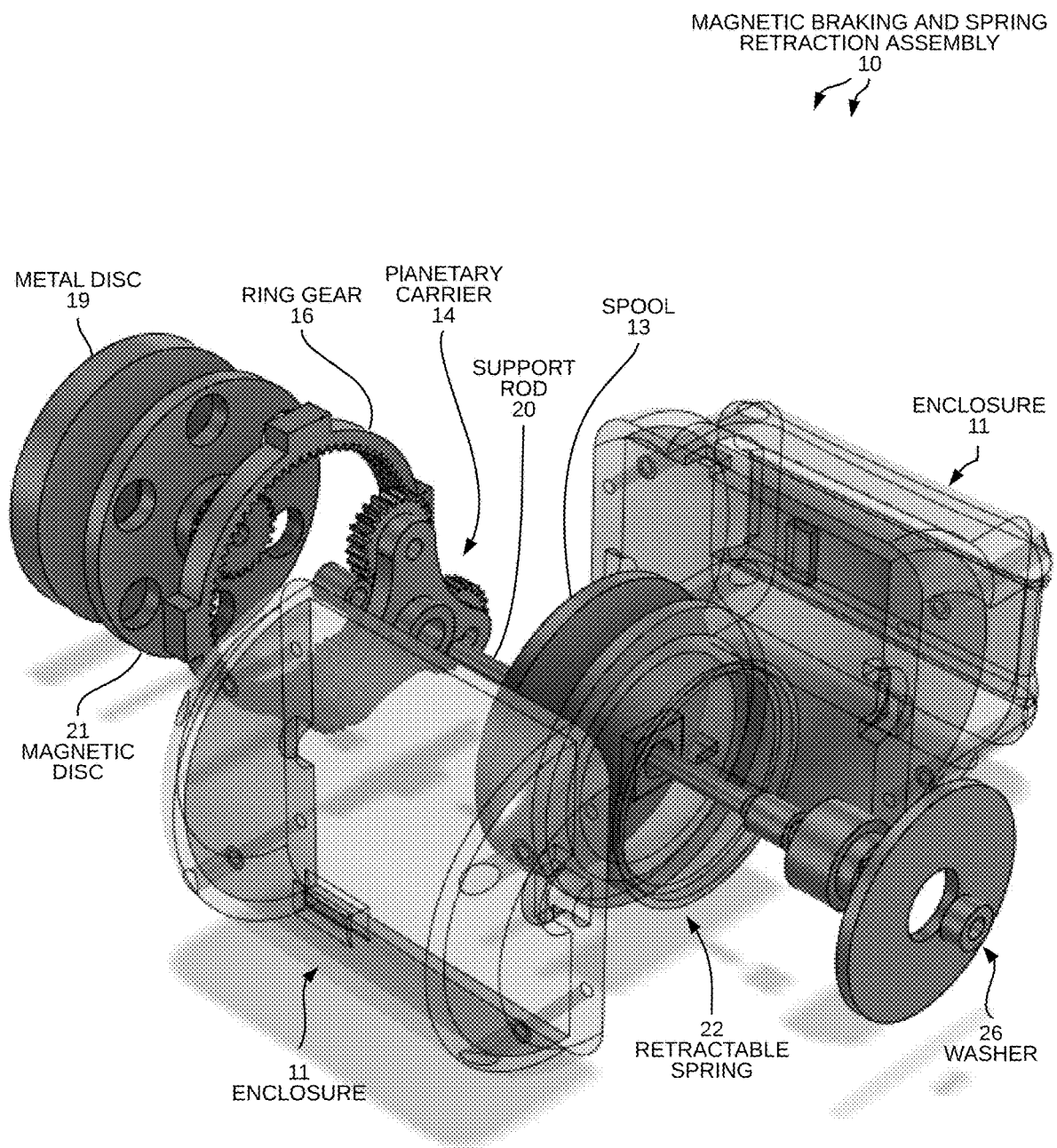
FIG. 7 is a diagram of another perspective exploded view of an exemplary magnetic braking and spring retraction assembly 10.

FIGS. 6 and 7 are perspective exploded views of the magnetic braking and spring retraction assembly 10. FIGS. 6-7 show an exemplary arrangement of the components of assembly 10. In this embodiment, the spool 13, planetary carrier 14, ring gear 16, metal disc 19, and magnetic disc 21 are each separate components. Separating the components reduces costs in the event that one of the components requires replacement or repair. Notably, the components can be coupled together such that they securely fit in the enclosure 11, reducing the risk of destabilizing during operation.

After the internal components are assembled, portions of the enclosure 11 are secured together. In this example, the right side of FIG. 6 (left side of FIG. 7), shows that one side enclosure 11 contains an opening for the leash 12 to be threaded through. In another example, the assembly 10 includes a different shaped tether (e.g. rope). In this example, the enclosure 11 is manufactured to accommodate various shaped tethers.

Figure 8:
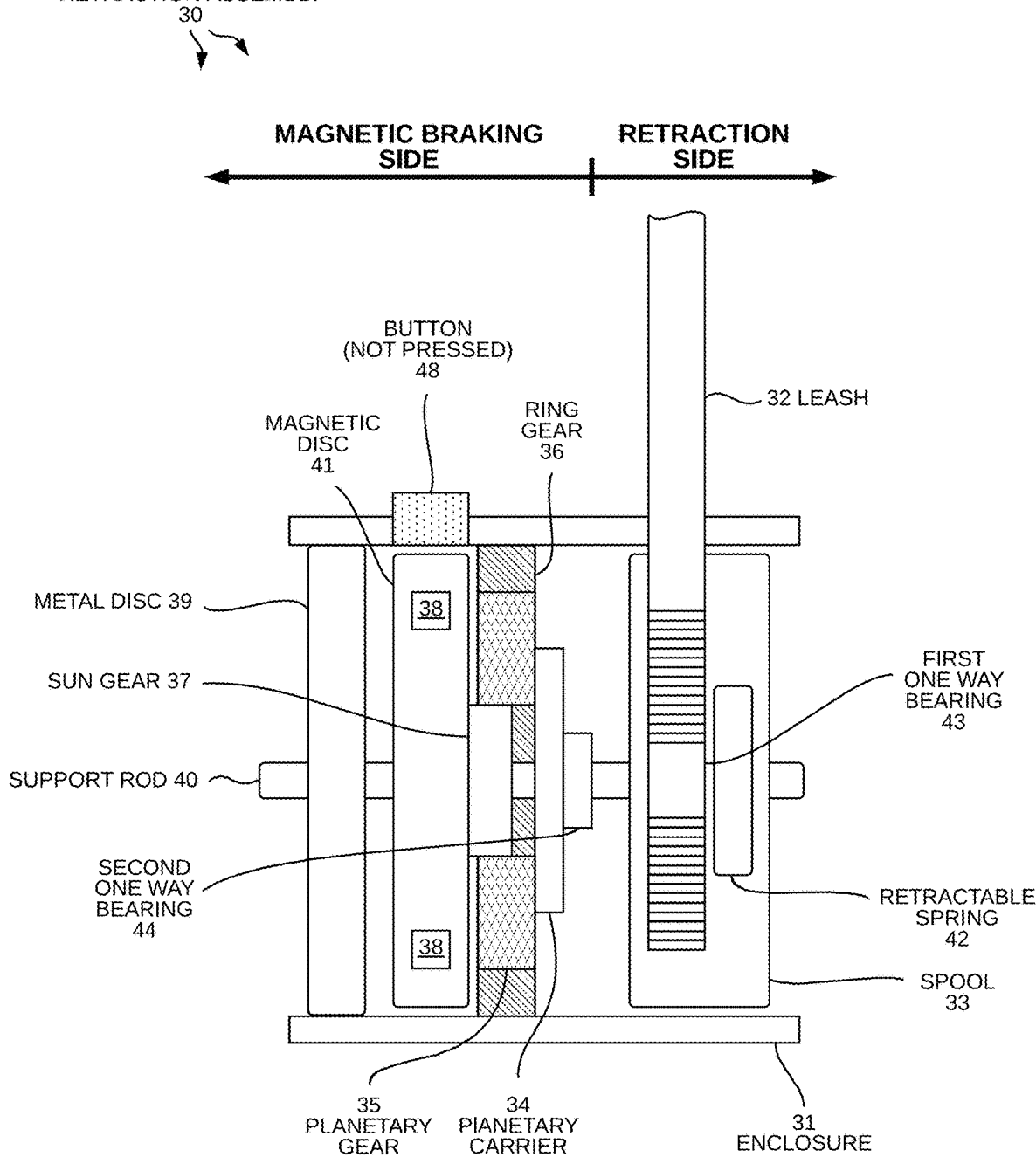
FIG. 8 is a flowchart in accordance with one novel aspect.

FIG. 8 is a cross-sectional diagram of another embodiment of a magnetic braking and spring retraction assembly 30. In this embodiment, assembly 30 includes an enclosure 31, a leash 32 attached to a spool 33 with a retractable spring 42, a planetary carrier 34 coupled to planetary gears 35, a ring gear 36, a sun gear 37, a magnetic disc 31 including magnets 38, a metal disc 39, a support rod 40, a first one way bearing 43, and a second one way bearing 44. Assembly 30 also includes washers coupled to the ends of support rod 40 and a cover coupled to spool 33 that are not shown in FIG. 8.

In addition, assembly 30 includes a button 48 coupled to enclosure 31. The button is operable in a first state and a second state. In the first state, button 48 is not pressed. In the second state, button 48 is pressed (depressed). The addition of button 48 allows a user to set an amount of leash 32 extendable from assembly 30.

Figure 9:
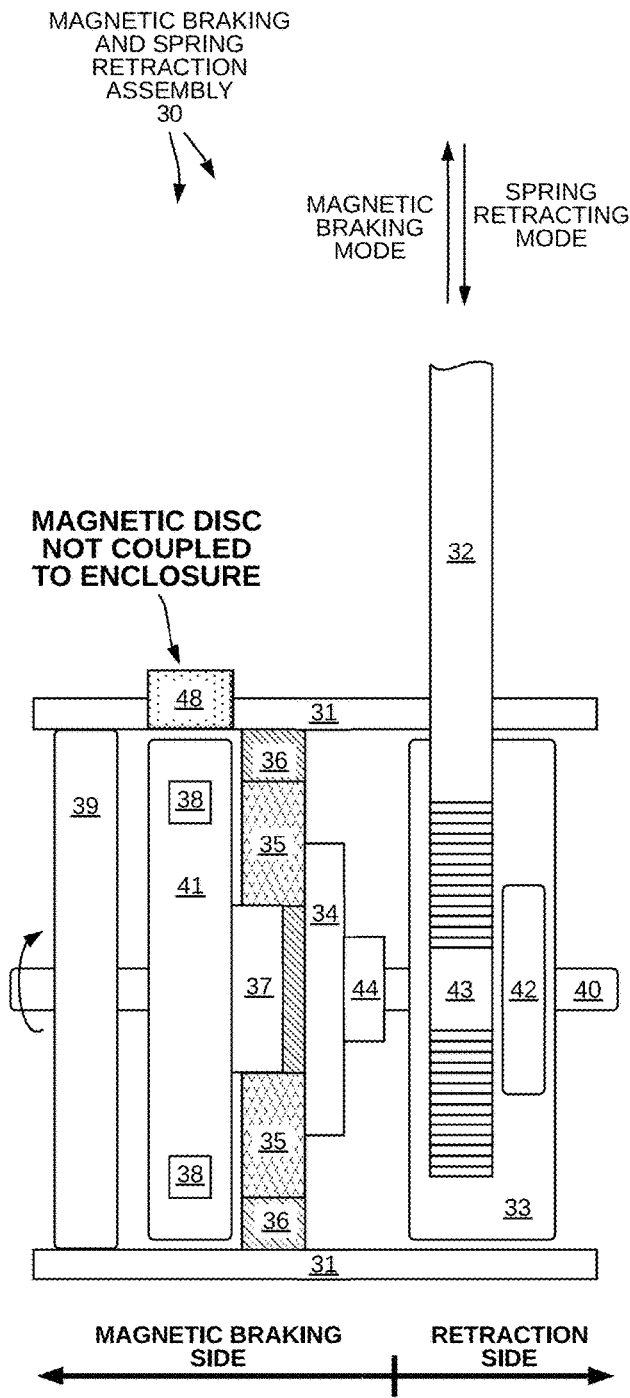
FIG. 9 is a smaller version of the diagram of FIG. 1 of the assembly 10 with a corresponding table 510.

FIG. 9 is a diagram of the magnetic braking and spring retraction assembly 30 and a corresponding table 510. Table 510 illustrates one method of operating the assembly 30. When button 48 is in the first state (not pressed), the magnetic disc 41 is not coupled to the enclosure 31. When the magnetic disc 41 is not coupled to the enclosure 31 assembly 30 is operable in a first operating mode and a second operating mode. In the first operating mode, the spool 33 is operable in a magnetic braking mode. In the second operating mode, the spool 33 is operable in a spring retracting mode.

When the spool 33 is operable in the magnetic braking mode, pulling or extending the leash 32 applies rotational force on the spool 33, causing the spool 33 to rotate in a counterclockwise direction. Additionally, pulling or extending the leash 32 causes the retractable spring 42 to compress. In the magnetic braking mode, the first one way bearing 43 locks to and drives support rod 40 in a counterclockwise direction. The support rod 40 rotating in counterclockwise direction causes the second one way bearing 44 to lock to the support rod 40. The second one way bearing 44 is coupled to and drives the planetary carrier 34 in a counterclockwise direction.

In another embodiment, the magnetic braking and spring retraction assembly 30 is provided without the second one way bearing 44. In the example without the second one way bearing 44, the planetary carrier 34 is fixed to the support rod 40. When the support rod 30 is rotated in the counterclockwise direction, the planetary carrier 34 rotates in a counterclockwise direction.

In yet another embodiment, the magnetic braking and spring retraction assembly 30 is provided without the first one way bearing 43. In the example without the first one way bearing 43, the spool 33 is fixed to the support rod 40. When the spool 33 rotates in the counterclockwise direction, the support rod 40 rotates in a counterclockwise direction.

In the example of FIG. 9, the planetary carrier 34 is coupled to three equally spaced planetary gears 35 (planet gears). In the magnetic braking mode the planetary carrier 34 rotates in a counterclockwise direction, driving the planetary gears 35 along the ring gear 36 in a counterclockwise direction. In other words, the planetary gears 35 revolve in a counterclockwise direction around the sun gear 37. The ring gear 36 is static (no rotational speed) due to being coupled to the enclosure 31. The planetary gears 35 cause the sun gear 37 to rotate in a counterclockwise direction.

In the example of FIG. 9, the sun gear 37 is coupled to the magnetic disc 41. In the magnetic braking mode, the sun gear 37 and magnetic disc 41 rotate in a counterclockwise direction. The static metal disc 39 exerts a drag force (magnetic braking force) on each of the magnets 38 moving with the rotating magnetic disc 41.

When the spool 33 is operable in the spring retracting mode, the retractable spring 42 decompresses and applies rotational force on the spool 33. The spool 33 rotates in a clockwise direction allowing the leash 32 to retract. In the spring retracting mode, the first one way bearing 43 freewheels and does not lock to the support rod 40. As a result, the support rod 40 is static and is not driven by the first one way bearing 43 while the spool 33 operates in the spring retracting mode. Additionally, the second one way bearing 44, planetary carrier 34, planetary gears 35, ring gear 36, sun gear 37, metal disc 39, and magnetic disc 41 are each static and not rotating. In other words, the magnetic braking side of the assembly 40 is disengaged and no magnetic braking force is generated when the leash 32 is retracting.

Figure 10:
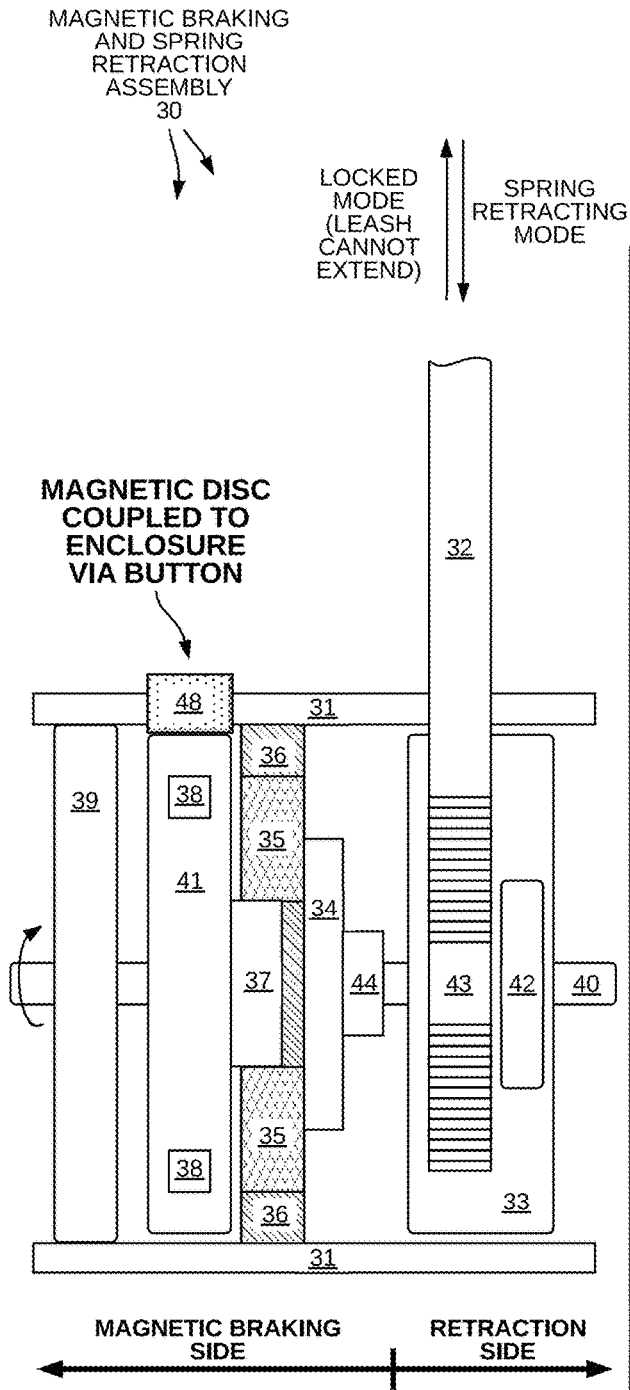
FIG. 10 is a diagram of the magnetic braking and spring retraction assembly 30 and a corresponding table 520.

FIG. 10 is a diagram of the magnetic braking and spring retraction assembly 30 and a corresponding table 520. Table 520 illustrates one method of operating the assembly 30. When button 48 is in the second state (pressed/depressed), magnetic disc 41 is coupled to the enclosure 31 via the button 48. When the magnetic disc 41 is coupled to the enclosure 31 assembly 30 is operable in a third operating mode and the second operating mode. In the third operating mode, the spool 33 is not operable in a magnetic braking mode. In the second operating mode, the spool 33 is operable in a spring retracting mode.

In the third operating mode, spool 33 is unable to rotate in the counterclockwise direction. When leash 42 attempts to extend away from the assembly 30, the spool 33, first one way bearing 43, second one way bearing 44, planetary carrier 34, and planetary gears 35 attempt to rotate in the counterclockwise direction. However, the magnetic disc 41 is coupled to the enclosure 31 and is unable to rotate in the counterclockwise direction due to being coupled to enclosure 31 via the button 48. As a result, the sun gear 37, which is coupled to magnetic disc 41, is static and unable to rotate in the counterclockwise direction. Ring gear 36 is static because it is coupled to the enclosure 31. Since the ring gear 36 and the sun gear 37 are static, the planetary gears 45 cannot rotate in the counterclockwise direction. Because the spool 33 is unable to rotate in the counterclockwise direction, the leash 32 cannot extend once the button 48 is pressed.

One novel aspect of the assembly 30 is that the spool 33 is operable in the spring retracting mode even when button 48 is in the second state (pressed/depressed). In other words, the assembly 30 is operable in the second operating mode. When the spool 33 is operable in the spring retracting mode, the retractable spring 42 decompresses and applies rotational force on the spool 33. The spool 33 rotates in a clockwise direction allowing the leash 32 to retract. In the spring retracting mode, the first one way bearing 43 freewheels and does not lock to the support rod 40. As a result, the support rod 40 is static and is not driven by the first one way bearing 43 while the spool 33 operates in the spring retracting mode. In other words, when the first one way bearing 43 freewheels, the support rod 40, second one way bearing 44, planetary carrier 34, planet gears 35, sun gear 37, and magnetic disc 41 are static regardless of whether or not the button 48 is depressed. Since the magnetic braking side of the assembly 30 is disengaged no magnetic braking force is generated when the leash 32 is retracting.

Figure 11:
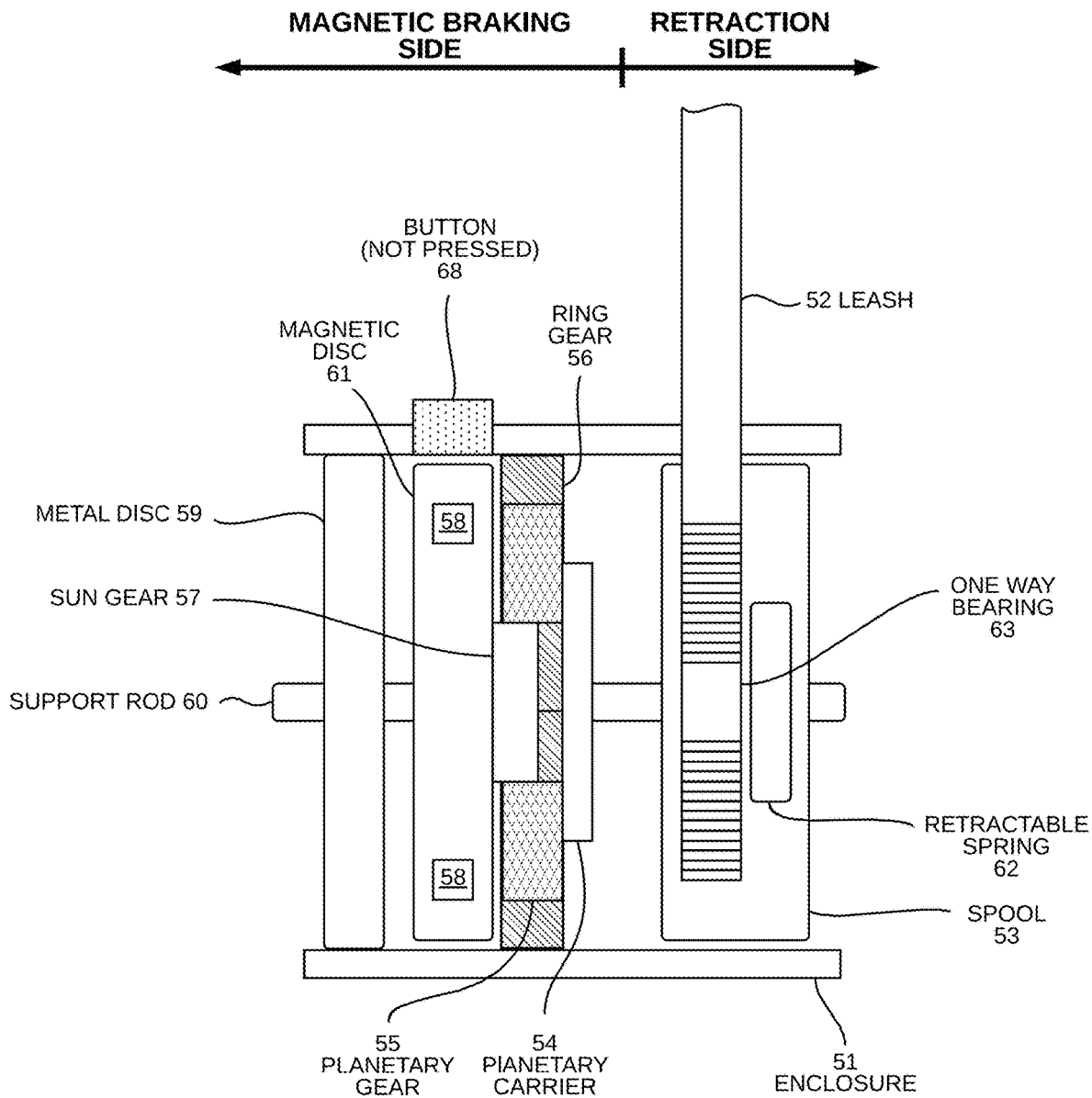
FIG. 11 is a cross-sectional diagram of another embodiment of a magnetic braking and spring retraction assembly 50.

FIG. 11 is a cross-sectional diagram of another embodiment of a magnetic braking and spring retraction assembly 50. In this embodiment, assembly 50 includes an enclosure 51, a leash 52 attached to a spool 53 with a retractable spring 62, a planetary carrier 54 coupled to planetary gears 55, a ring gear 56, a sun gear 57, a magnetic disc 61 including magnets 58, a metal disc 59, a support rod 60. Assembly 50 also includes washers coupled to the ends of support rod 60 and a cover coupled to spool 53 that are not shown in FIG. 11.

In addition, assembly 50 includes a button 68 coupled to enclosure 51. The button is operable in a first state and a second state. In the first state, button 68 is not pressed. In the second state, button 68 is pressed (depressed). The addition of button 68 allows a user to set an amount of leash 52 extendable from assembly 50.

When button 68 is in the first state (not pressed), the magnetic disc 61 is not coupled to the enclosure 51. When the magnetic disc 61 is not coupled to the enclosure 51 assembly 50 is operable in a first operating mode and a second operating mode. In the first operating mode, the spool 53 is operable in a magnetic braking mode. In the second operating mode, the spool 53 is operable in a spring retracting mode.

When the spool 53 is operable in the magnetic braking mode, pulling or extending the leash 52 applies rotational force on the spool 53, causing the spool 53 to rotate in a counterclockwise direction. Additionally, pulling or extending the leash 52 causes the retractable spring 62 to compress.

In one novel aspect, assembly 50 includes only a single one way bearing, 63. The one way bearing 63 can be coupled to various components of assembly 50. For example, in the embodiment of FIG. 11, the spool 53 is coupled to the support rod 60 via the one way bearing 63 and the planetary carrier 54 is coupled to the support rod 60. In the magnetic braking mode, the one way bearing 63 locks to and drives support rod 60 in a counterclockwise direction. The support rod 60 drives the planetary carrier 54 in counterclockwise direction.

In another embodiment, the spool 53 is coupled to the support rod 60 and the planetary carrier 54 is coupled to the support rod 60 via the one way bearing 63. In the example where the spool 53 is coupled to the support rod 60, in the magnetic braking mode, the spool 53 drives the support rod 60 in a counterclockwise direction. The one way bearing 63 locks to the support rod 60 causing the planetary carrier 54 to rotate in a counterclockwise direction.

In the example of FIG. 11, the planetary carrier 54 is coupled to three equally spaced planetary gears 55 (planet gears). In the magnetic braking mode the planetary carrier 54 rotates in a counterclockwise direction, driving the planetary gears 55 along the ring gear 56 in a counterclockwise direction. In other words, the planetary gears 55 revolve in a counterclockwise direction around the sun gear 57. The ring gear 56 is static (no rotational speed) due to being coupled to the enclosure 51. The planetary gears 55 cause the sun gear 57 to rotate in a counterclockwise direction.

In the example of FIG. 11, the sun gear 57 is coupled to the magnetic disc 61. In the magnetic braking mode, the sun gear 57 and magnetic disc 61 rotate in a counterclockwise direction. The static metal disc 59 exerts a drag force (magnetic braking force) on each of the magnets 58 moving with the rotating magnetic disc 61.

When the spool 53 is operable in the spring retracting mode, the retractable spring 62 decompresses and applies rotational force on the spool 53. The spool 53 rotates in a clockwise direction allowing the leash 52 to retract. In the spring retracting mode, the one way bearing 63 freewheels and does not lock to the support rod 40. As a result, the support rod 60 is static and is not driven by the one way bearing 63 while the spool 53 operates in the spring retracting mode. Additionally, the planetary carrier 54, planetary gears 55, ring gear 56, sun gear 57, metal disc 59, and magnetic disc 61 are each static and not rotating. In other words, the magnetic braking side of the assembly 50 is disengaged and no magnetic braking force is generated when the leash 52 is retracting.

When button 68 is in the second state (pressed/depressed), magnetic disc 61 is coupled to the enclosure 51 via the button 68. When the magnetic disc 61 is coupled to the enclosure 51 assembly 50 is operable in a third operating mode and the second operating mode. In the third operating mode, the spool 53 is not operable in a magnetic braking mode. In the second operating mode, the spool 53 is operable in a spring retracting mode.

In the third operating mode, spool 53 is unable to rotate in the counterclockwise direction. When leash 62 attempts to extend away from the assembly 50, the spool 53, one way bearing 63, planetary carrier 54, and planetary gears 55 attempt to rotate in the counterclockwise direction. However, the magnetic disc 61 is coupled to the enclosure 51 and is unable to rotate in the counterclockwise direction due to being coupled to enclosure 51 via the button 68. As a result, the sun gear 57, which is coupled to magnetic disc 61, is static and unable to rotate in the counterclockwise direction. Ring gear 56 is static because it is coupled to the enclosure 51. Since the ring gear 56 and the sun gear 57 are static, the planetary gears 55 cannot rotate in the counterclockwise direction. Because the spool 53 is unable to rotate in the counterclockwise direction, the leash 52 cannot extend once the button 68 is pressed.

One novel aspect of the assembly 50 is that the spool 63 is operable in the spring retracting mode even when button 68 is in the second state (pressed/depressed). In other words, the assembly 50 is operable in the second operating mode. When the spool 53 is operable in the spring retracting mode, the retractable spring 62 decompresses and applies rotational force on the spool 53. The spool 53 rotates in a clockwise direction allowing the leash 52 to retract. In the spring retracting mode, the one way bearing 63 freewheels and does not lock to the support rod 60. As a result, the support rod 60 is static and is not driven by the one way bearing 63 while the spool 53 operates in the spring retracting mode. In other words, when the one way bearing 63 freewheels, the support rod 60, planetary carrier 54, planet gears 55, sun gear 57, and magnetic disc 61 are static regardless of whether or not the button 68 is depressed. Since the magnetic braking side of the assembly 50 is disengaged no magnetic braking force is generated when the leash 52 is retracting.

Figure 12:
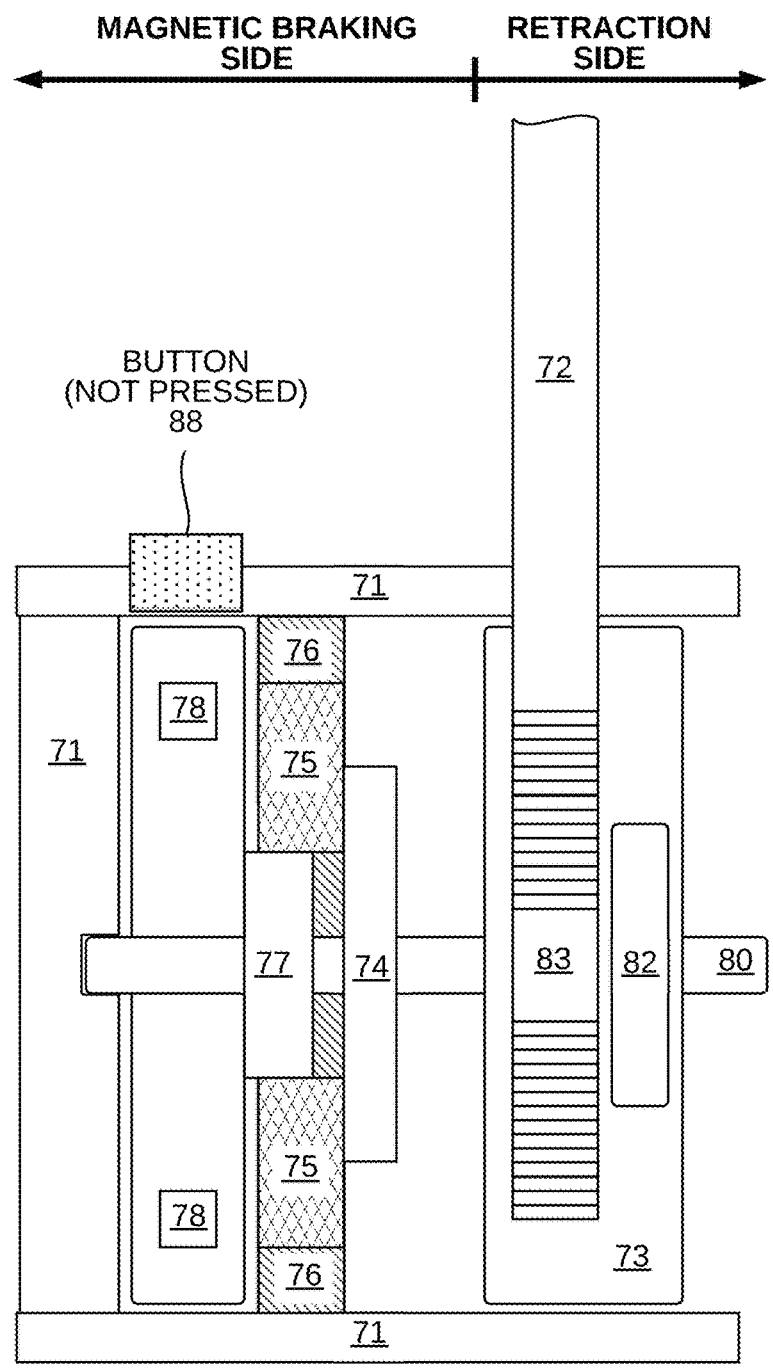
FIG. 12 is a cross-sectional diagram of another embodiment of a magnetic braking and spring retraction assembly 70.

FIG. 12 is a cross-sectional diagram of another embodiment of a magnetic braking and spring retraction assembly 70. In this embodiment, assembly 70 includes an enclosure 71, a leash 72 attached to a spool 73 with a retractable spring 82, a planetary carrier 74 coupled to planetary gears 75, a ring gear 76, a sun gear 77, a magnetic disc 81 including magnets 78, and a support rod 80. Assembly 70 also includes washers coupled to the ends of support rod 80 and a cover coupled to spool 73 that are not shown in FIG. 12.

In addition, assembly 70 includes a button 68 coupled to enclosure 71. The button is operable in a first state and a second state. In the first state, button 68 is not pressed. In the second state, button 68 is pressed (depressed). The addition of button 68 allows a user to set an amount of leash 72 extendable from assembly 70.

When button 68 is in the first state (not pressed), the magnetic disc 81 is not coupled to the enclosure 71. When the magnetic disc 81 is not coupled to the enclosure 71 assembly 70 is operable in a first operating mode and a second operating mode. In the first operating mode, the spool 73 is operable in a magnetic braking mode. In the second operating mode, the spool 73 is operable in a spring retracting mode.

When the spool 73 is operable in the magnetic braking mode, pulling or extending the leash 72 applies rotational force on the spool 73, causing the spool 73 to rotate in a counterclockwise direction. Additionally, pulling or extending the leash 72 causes the retractable spring 82 to compress.

In one novel aspect, assembly 70 includes only a single one way bearing, 63. The one way bearing 63 can be coupled to various components of assembly 70. For example, in the embodiment of FIG. 12, the spool 73 is coupled to the support rod 80 via the one way bearing 63 and the planetary carrier 74 is coupled to the support rod 80. In the magnetic braking mode, the one way bearing 63 locks to and drives support rod 80 in a counterclockwise direction. The support rod 80 drives the planetary carrier 74 in counterclockwise direction.

In another embodiment, the spool 73 is coupled to the support rod 80 and the planetary carrier 74 is coupled to the support rod 80 via the one way bearing 63. In the example where the spool 73 is coupled to the support rod 80, in the magnetic braking mode, the spool 73 drives the support rod 60 in a counterclockwise direction. The one way bearing 63 locks to the support rod 60 causing the planetary carrier 74 to rotate in a counterclockwise direction.

In the example of FIG. 12, the planetary carrier 74 is coupled to three equally spaced planetary gears 75 (planet gears). In the magnetic braking mode the planetary carrier 74 rotates in a counterclockwise direction, driving the planetary gears 75 along the ring gear 76 in a counterclockwise direction. In other words, the planetary gears 75 revolve in a counterclockwise direction around the sun gear 77. The ring gear 76 is static (no rotational speed) due to being coupled to the enclosure 71. The planetary gears 75 cause the sun gear 77 to rotate in a counterclockwise direction.

One novel aspect of the assembly 70 is that the enclosure 71 is made of metal. One benefit of using metal for the enclosure 71 is that there is no need for a metal disc because the enclosure 71 can generate a magnetic braking force. Another benefit of using metal for the enclosure 71 would be the durability of the assembly 70.

In the example of FIG. 12, the sun gear 77 is coupled to the magnetic disc 81. In the magnetic braking mode, the sun gear 77 and magnetic disc 81 rotate in a counterclockwise direction. The enclosure 71 exerts a drag force (magnetic braking force) on each of the magnets 78 moving with the rotating magnetic disc 81.

When the spool 73 is operable in the spring retracting mode, the retractable spring 82 decompresses and applies rotational force on the spool 73. The spool 73 rotates in a clockwise direction allowing the leash 72 to retract. In the spring retracting mode, the one way bearing 63 freewheels and does not lock to the support rod 40. As a result, the support rod 60 is static and is not driven by the one way bearing 63 while the spool 73 operates in the spring retracting mode. Additionally, the planetary carrier 74, planetary gears 75, ring gear 76, sun gear 77, and magnetic disc 81 are each static and not rotating. In other words, the magnetic braking side of the assembly 70 is disengaged and no magnetic braking force is generated when the leash 72 is retracting.

When button 68 is in the second state (pressed/depressed), magnetic disc 61 is coupled to the enclosure 71 via the button 68. When the magnetic disc 61 is coupled to the enclosure 71 assembly 70 is operable in a third operating mode and the second operating mode. In the third operating mode, the spool 73 is not operable in a magnetic braking mode. In the second operating mode, the spool 73 is operable in a spring retracting mode.

In the third operating mode, spool 73 is unable to rotate in the counterclockwise direction. When leash 82 attempts to extend away from the assembly 70, the spool 73, one way bearing 63, planetary carrier 74, and planetary gears 75 attempt to rotate in the counterclockwise direction. However, the magnetic disc 61 is coupled to the enclosure 71 and is unable to rotate in the counterclockwise direction due to being coupled to enclosure 71 via the button 68. As a result, the sun gear 57, which is coupled to magnetic disc 61, is static and unable to rotate in the counterclockwise direction. Ring gear 76 is static because it is coupled to the enclosure 71. Since the ring gear 76 and the sun gear 57 are static, the planetary gears 75 cannot rotate in the counterclockwise direction. Because the spool 73 is unable to rotate in the counterclockwise direction, the leash 72 cannot extend once the button 68 is pressed.

One novel aspect of the assembly 70 is that the spool 63 is operable in the spring retracting mode even when button 68 is in the second state (pressed/depressed). In other words, the assembly 70 is operable in the second operating mode. When the spool 73 is operable in the spring retracting mode, the retractable spring 82 decompresses and applies rotational force on the spool 73. The spool 73 rotates in a clockwise direction allowing the leash 72 to retract. In the spring retracting mode, the one way bearing 63 freewheels and does not lock to the support rod 60. As a result, the support rod 60 is static and is not driven by the one way bearing 63 while the spool 73 operates in the spring retracting mode. In other words, when the one way bearing 63 freewheels, the support rod 60, planetary carrier 74, planet gears 75, sun gear 57, and magnetic disc 61 are static regardless of whether or not the button 68 is depressed. Since the magnetic braking side of the assembly 50 is disengaged no magnetic braking force is generated when the leash 72 is retracting.

FIG. 13 is a table 530 that illustrates various methods of operating a magnetic braking and spring retracting assembly.

Figure 14:
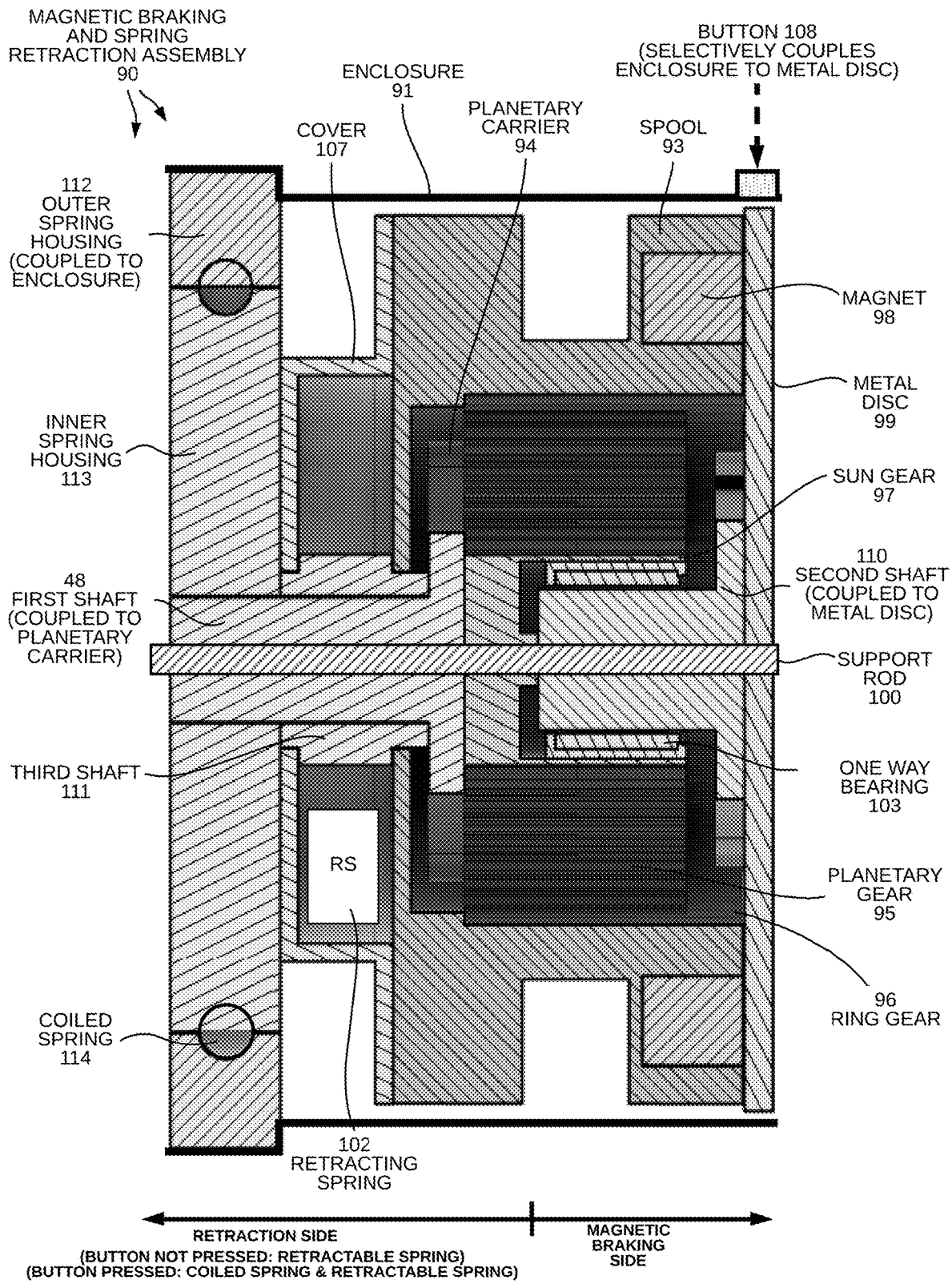
FIG. 14 is a cross sectional diagram of another embodiment of a magnetic braking and spring retraction assembly 90.

FIG. 14 is a cross sectional diagram of another embodiment of a magnetic braking and spring retraction assembly 90. In this embodiment, assembly 90 includes an enclosure 91, a spool 93, a planetary carrier 94 coupled to planetary gears 95, a one way bearing 103, a sun gear 97, a metal disc 99, and a support rod 100. Ends of support rod 100 are coupled to the enclosure 91 such that the support rod 100 does not move or rotate. Furthermore, assembly 90 includes a first shaft 109, a second shaft 110, a third shaft 110, making assembly 90 more robust. Although not shown, assembly 90 includes a leash that is coupled to the spool 93.

Assembly 90 also includes a retractable spring 102, a cover 107, a coiled spring 114, an outer spring housing 112, and an inner spring housing 113. The use of multiple springs allows assembly 90 to withstand a heavier load on the leash.

One novel aspect of assembly 90 is that a ring gear 96 and magnets 98 are disposed within the spool 93, thereby reducing the number of moving components and reducing the overall size required for enclosure 91.

In addition, assembly 90 includes a button 108 coupled to enclosure 91. The button 108 is operable in a first state and a second state. In the first state, button 108 is not pressed. In the second state, button 108 is pressed (depressed). The addition of button 108 allows a user to set an amount of leash extendable from assembly 90. A more in-depth explanation regarding the operative components of assembly 90 is described in the detailed description below.

Figure 15:
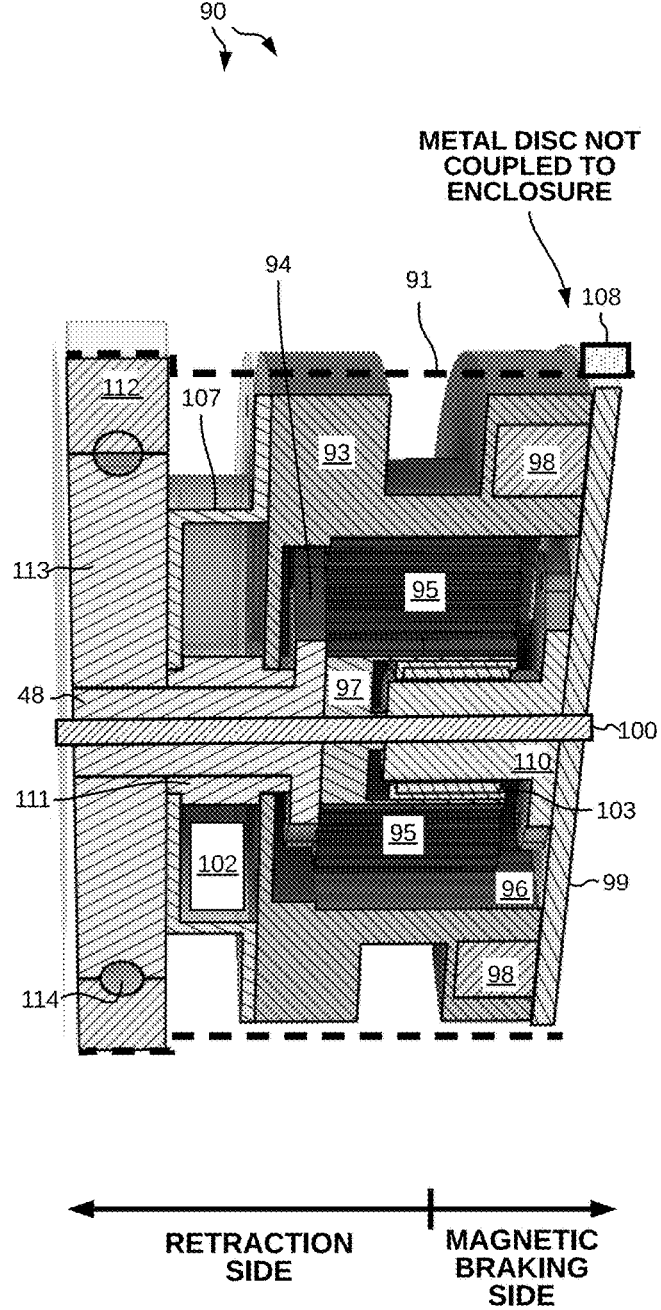
FIG. 15 is a diagram of the magnetic braking and spring retraction assembly 90 and a corresponding table 540.

FIG. 15 is a diagram of the magnetic braking and spring retraction assembly 90 and a corresponding table 540. Table 540 illustrates one method of operating the assembly 90.

When button 108 is in the first state (not pressed), the metal disc 99 is not coupled to the enclosure 91. When the metal disc 99 is not coupled to the enclosure 91, assembly 90 is operable in a first operating mode and a second operating mode. In the first operating mode, the spool 93 is operable in a magnetic braking mode. In the second operating mode, the spool 93 is operable in a spring retracting mode.

In the first operating mode, as the leash extends away from the assembly 90, the spool 93 rotates in a counterclockwise direction. The ring gear 96 disposed within the spool 93 rotates in a counterclockwise direction. The ring gear 96 causes each planetary gear 95 to rotate in a counterclockwise direction. The planetary gears 95 do not revolve around the sun gear 97. Rather, the planetary gears 95 drive the sun gear 97 such that the sun gear 97 rotates in the clockwise direction. The sun gear 97 is coupled to the second shaft 110 via the one way bearing 103. In the magnetic braking mode, the one way bearing 103 locks to the second shaft 110 which is coupled to the metal disc 99. The metal disc 99 is rotating clockwise while the magnets 98 disposed in the spool 93 rotate in the counterclockwise direction. The metal disc 99 exerts a drag force (magnetic braking force) on each of the magnets 98 moving with the rotating spool 91.

In the magnetic braking mode, the retractable spring 102 is compressing while the coiled spring 114 remains static. The coiled spring 114 remains static because the planetary carrier 94 is not rotating.

One novel aspect of the assembly 90 is that the spool 93 is operable in the spring retracting mode even when button 108 is in the second state (pressed/depressed). In other words, the assembly 90 is operable in the fourth operating mode.

When the spool 93 is operable in the spring retracting mode, the retractable spring 102 decompresses and applies rotational force on the spool 93, causing the spool 93 to rotate in a clockwise direction. The ring gear 96 is disposed within the spool 93 and rotates in a clockwise direction. The ring gear 96 causes each planetary gear 95 to rotate in a clockwise direction. Importantly, the planetary gears 95 do not revolve around the sun gear 97. Since the planetary gears 95 coupled to the planetary carrier 94 are not revolving, the planetary carrier 94 remains static and does not drive the first shaft 109. The third shaft 110 and the coiled spring remain static.

The planetary gears 95 drive the sun gear 97 in the counterclockwise direction. The sun gear 97 is coupled to the second shaft 110 via the one way bearing 103. In the spring retracting mode, as the sun gear 97 rotates counter clockwise, the one way bearing freewheels in the counterclockwise direction. The second shaft 110 and metal disc 99 are static and are not being driven by the one way bearing. In other words, the magnetic braking side of the assembly 90 is disengaged and no magnetic braking force is generated when the leash is retracting.

Figure 16:
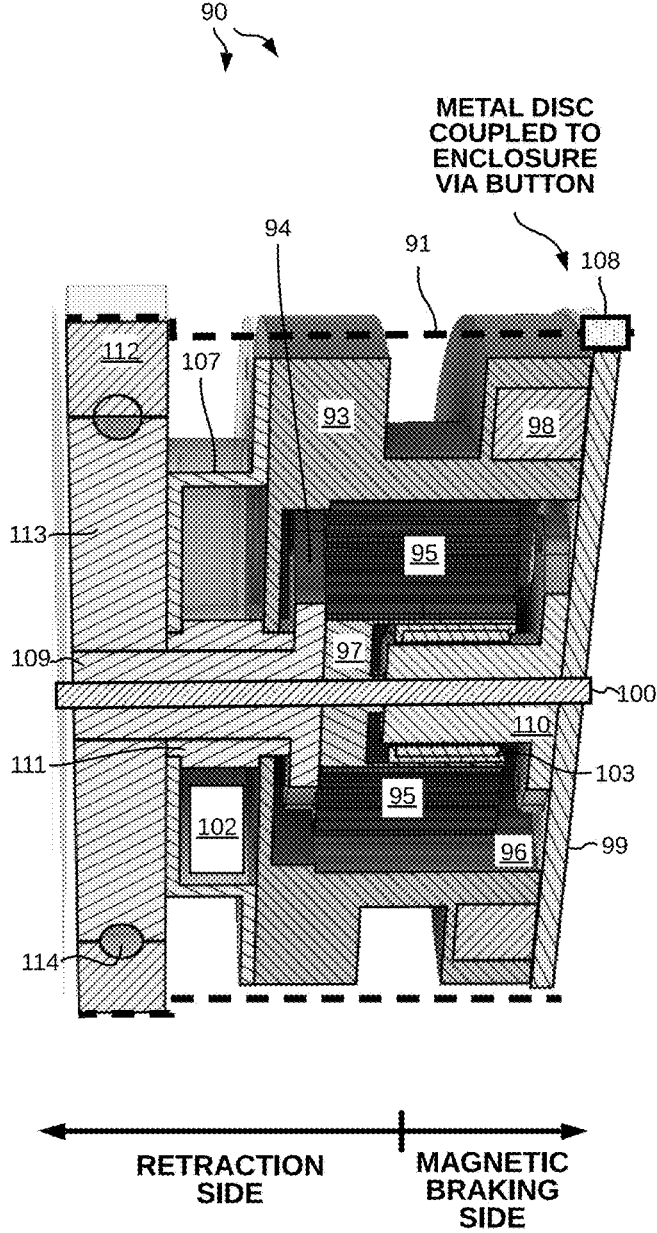
FIG. 16 is a diagram of the magnetic braking and spring retraction assembly 90 and a corresponding table 550.

FIG. 16 is a diagram of the magnetic braking and spring retraction assembly 90 and a corresponding table 550. Table 550 illustrates one method of operating the assembly 90.

When button 108 is in the second state (pressed/depressed), the metal disc 99 is coupled to the enclosure 91 via the button 108. When the metal disc 99 is coupled to the enclosure 91, assembly 90 is operable in a third operating mode and a fourth operating mode. In the third operating mode, the spool 93 is operable in a limited magnetic braking mode. In the fourth operating mode, the spool 93 is operable in a spring retracting mode.

In the third operating mode, the metal disc 99 and the second shaft 110 are static. As a result, the one way bearing 103 and the sun gear 97 are static. When the leash extends away from the assembly 90, the spool 93 rotates in a counterclockwise direction. The ring gear 96 is disposed within the spool 93 and rotates in a counterclockwise direction. The ring gear 96 causes each planetary gear 95 to rotate in a counterclockwise direction. The planetary gears 95 revolve in a counterclockwise direction around the sun gear 97. The planetary gears 95 coupled to the planetary carrier 94 and cause the planetary carrier 94 to rotate in a counterclockwise direction. The first shaft 109 is coupled to the planetary carrier 94 and drives the third shaft 110 in the counterclockwise direction.

In the limited magnetic braking mode, the coiled spring 114 is compressing. While the coiled spring 114 is compressing, the spool 93 is operable in the magnetic braking mode. Once the coiled spring 114 is fully compressed, the coiled spring 114 prevents the spool 93 from further rotating in the counterclockwise direction.

One novel aspect of the assembly 90 is that the spool 93 is operable in the spring retracting mode even when button 108 is in the second state (pressed/depressed). In other words, the assembly 90 is operable in the fourth operating mode.

In the fourth operable mode, the metal disc 99 and the second shaft 110 are static. As a result, the one way bearing 103 and the sun gear 97 are static. In the fourth operating mode, the coiled spring 114 is decompressing and applies rotational force in the clockwise direction. The retractable spring 102 is also decompressing and applies rotational force in the clockwise direction.

The planetary carrier 94 rotates in the clockwise direction and drives the planetary gears 95 to rotate in a clockwise direction. Since the sun gear 97 is static, as the planetary gears 95 drive the ring gear 96 in the clockwise direction while revolving around the sun gear 97. As a result, the spool 93 rotates in the clockwise direction, retracting the leash towards the assembly.

Figure 17:
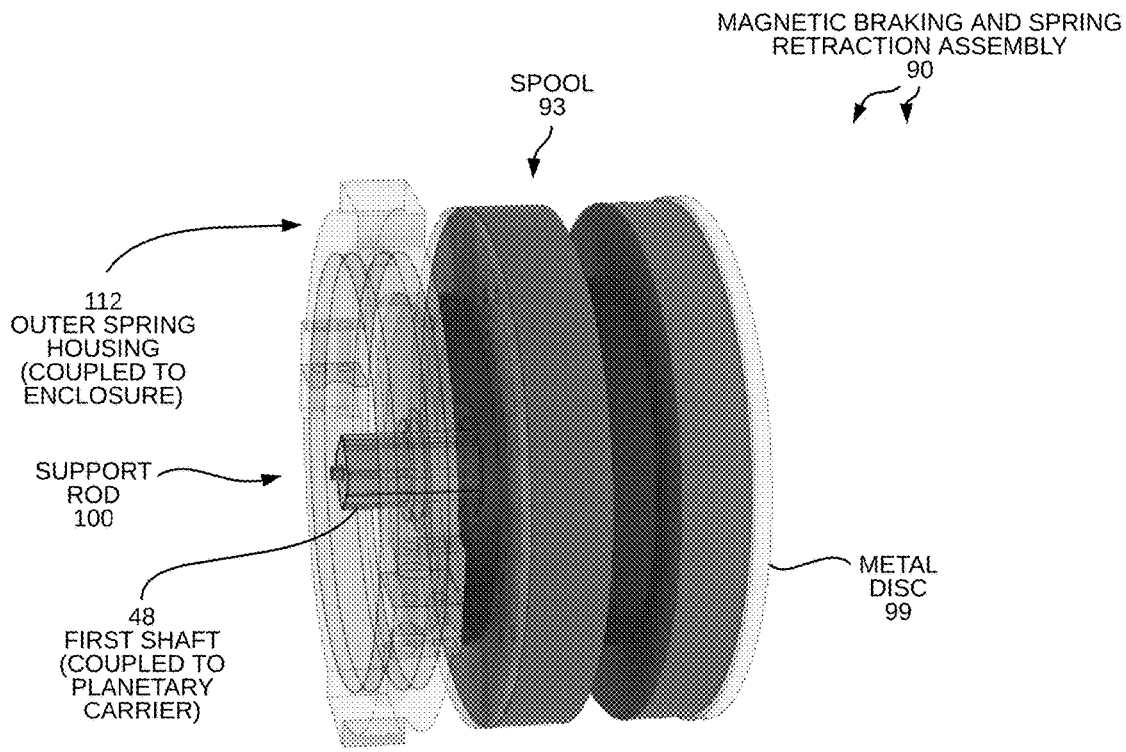
FIG. 17 is a perspective diagram of the magnetic braking and spring retraction assembly 90.

FIG. 17 is a perspective diagram of the magnetic braking and spring retraction assembly 90. FIG. 17 shows the outer spring housing 112 of assembly 90.

Figure 18:
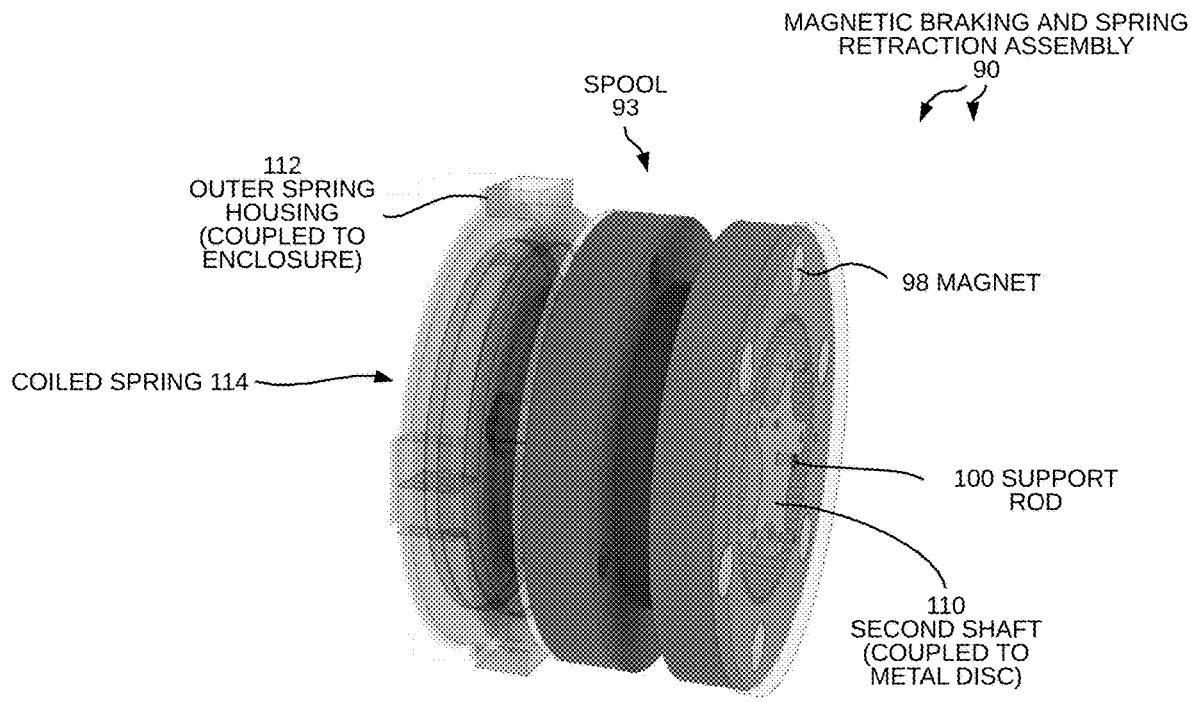
FIG. 18 is another perspective diagram of the magnetic braking and spring retraction assembly 90.

FIG. 18 is another perspective diagram of the magnetic braking and spring retraction assembly 90. FIG. 18 shows the magnets 98 disposed within the spool 93 of assembly 90.

Figure 19:
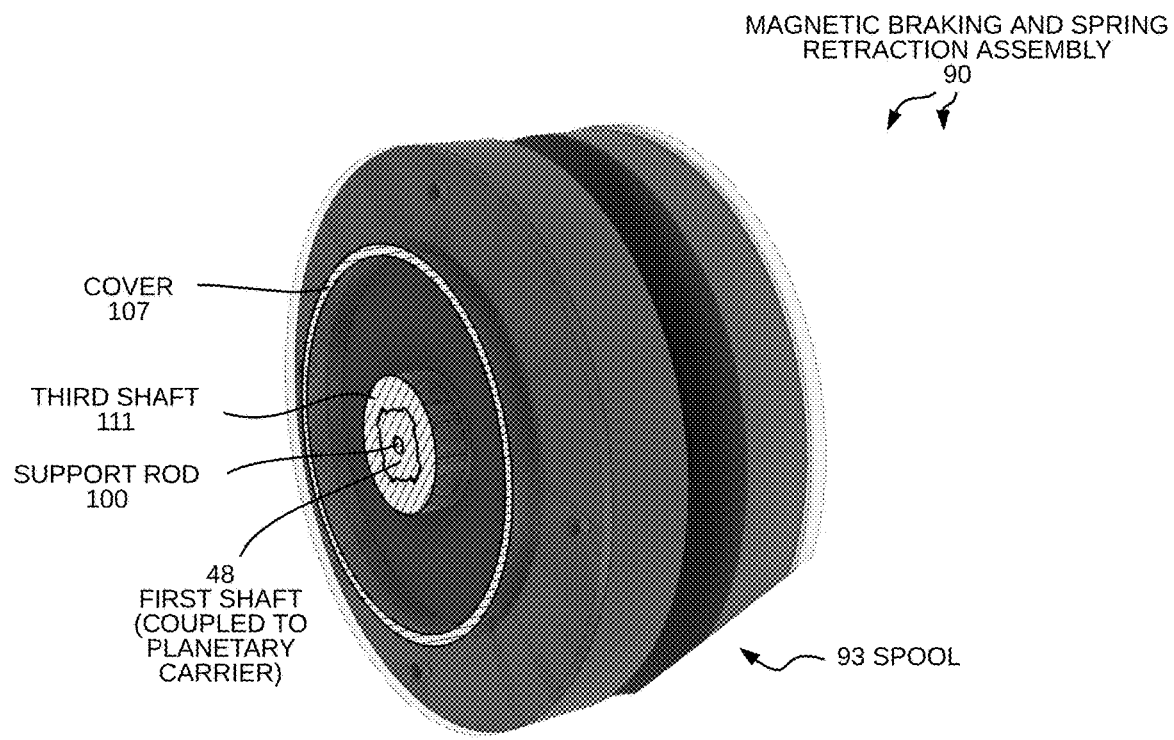
FIG. 19 is a cross-sectional perspective diagram of the magnetic braking and spring retraction assembly 90.

FIG. 19 is a cross-sectional perspective diagram of the magnetic braking and spring retraction assembly 90. FIG. 19 shows the cover 107 of assembly 90 with a portion of the cover 107 removed.

Figure 20:
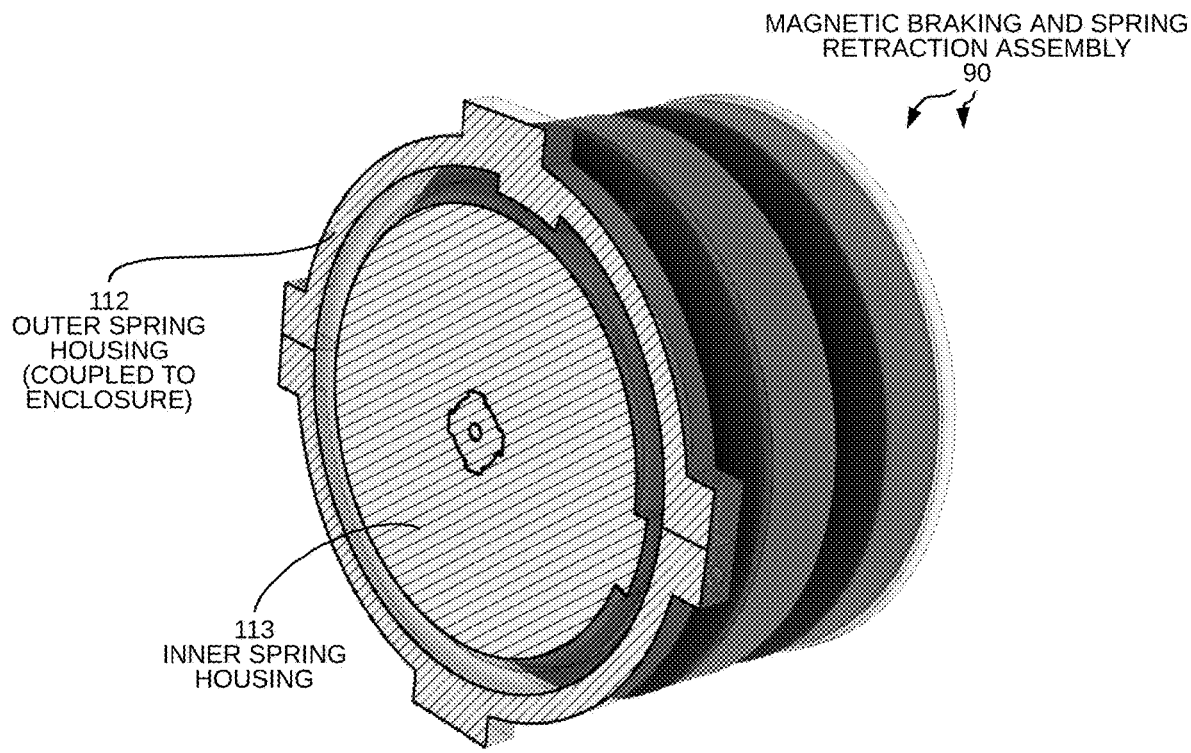
FIG. 20 is a cross-sectional perspective diagram of the magnetic braking and spring retraction assembly 90.

FIG. 20 is a cross-sectional perspective diagram of the magnetic braking and spring retraction assembly 90. FIG. 20 shows the inner spring housing 113 and the outer spring housing 112.

Figure 21:
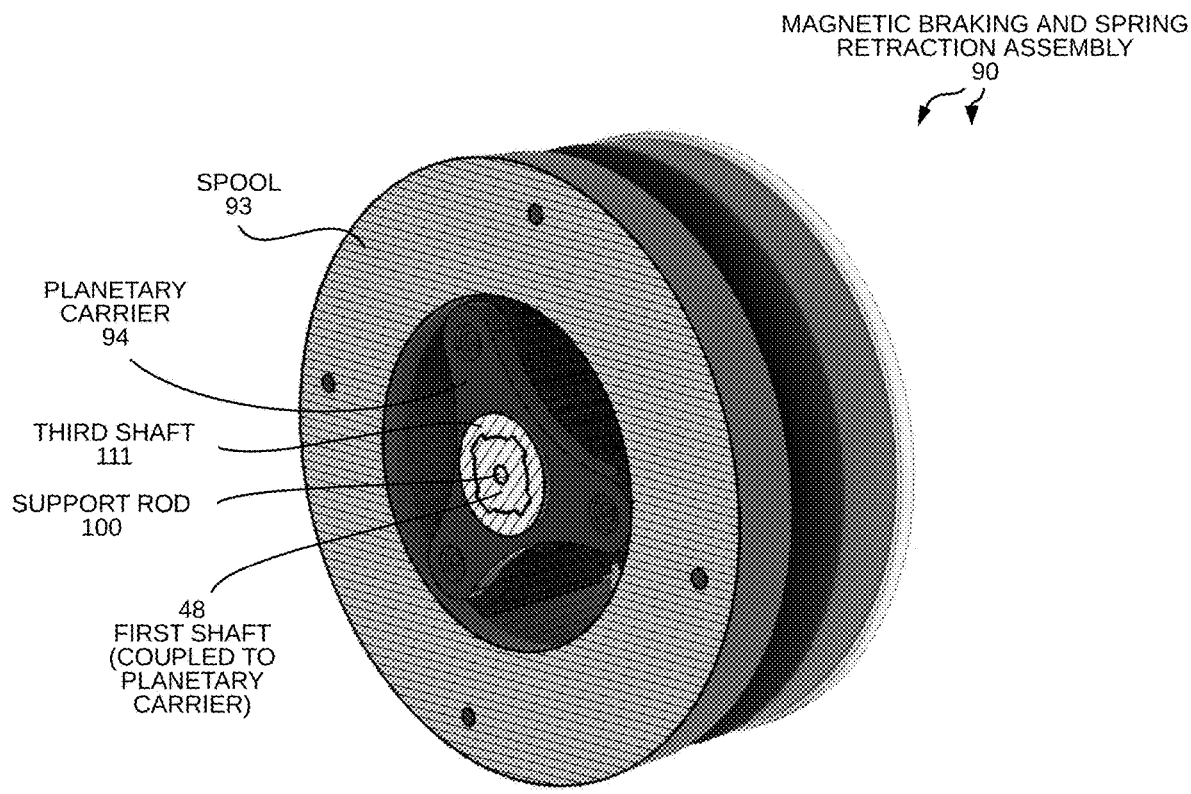
FIG. 21 is a cross-sectional perspective diagram of the magnetic braking and spring retraction assembly 90.

FIG. 21 is a cross-sectional perspective diagram of the magnetic braking and spring retraction assembly 90. The cover is not shown in FIG. 21.

Figure 22:
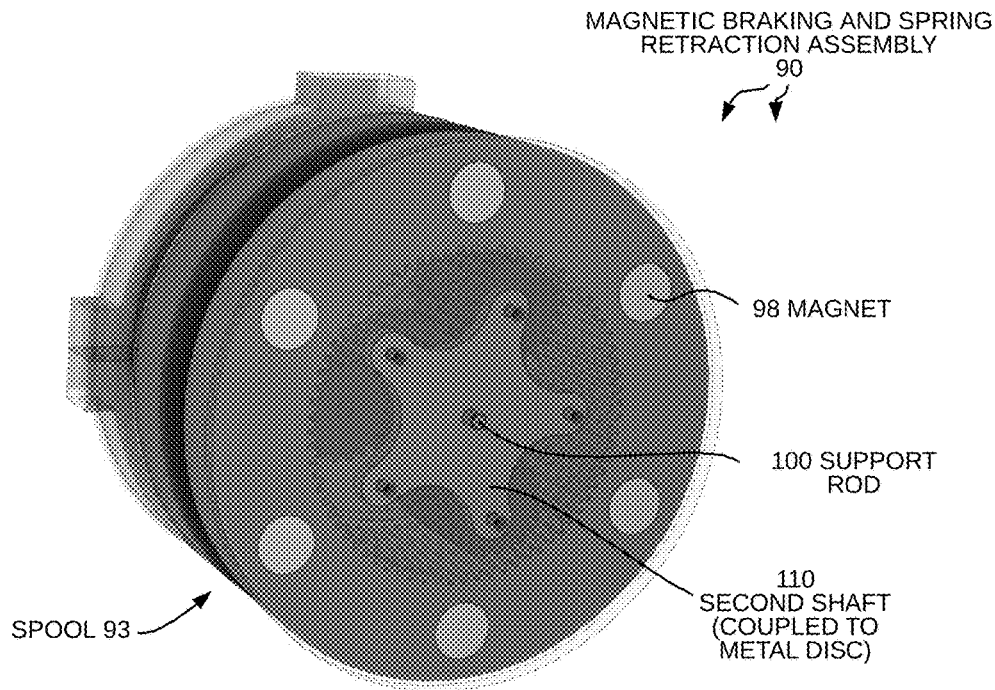
FIG. 22 is a perspective diagram of the magnetic braking and spring retraction assembly 90.

FIG. 22 is a perspective diagram of the magnetic braking and spring retraction assembly 90. The metal disc 99 is not shown in FIG. 22.

Figure 23:
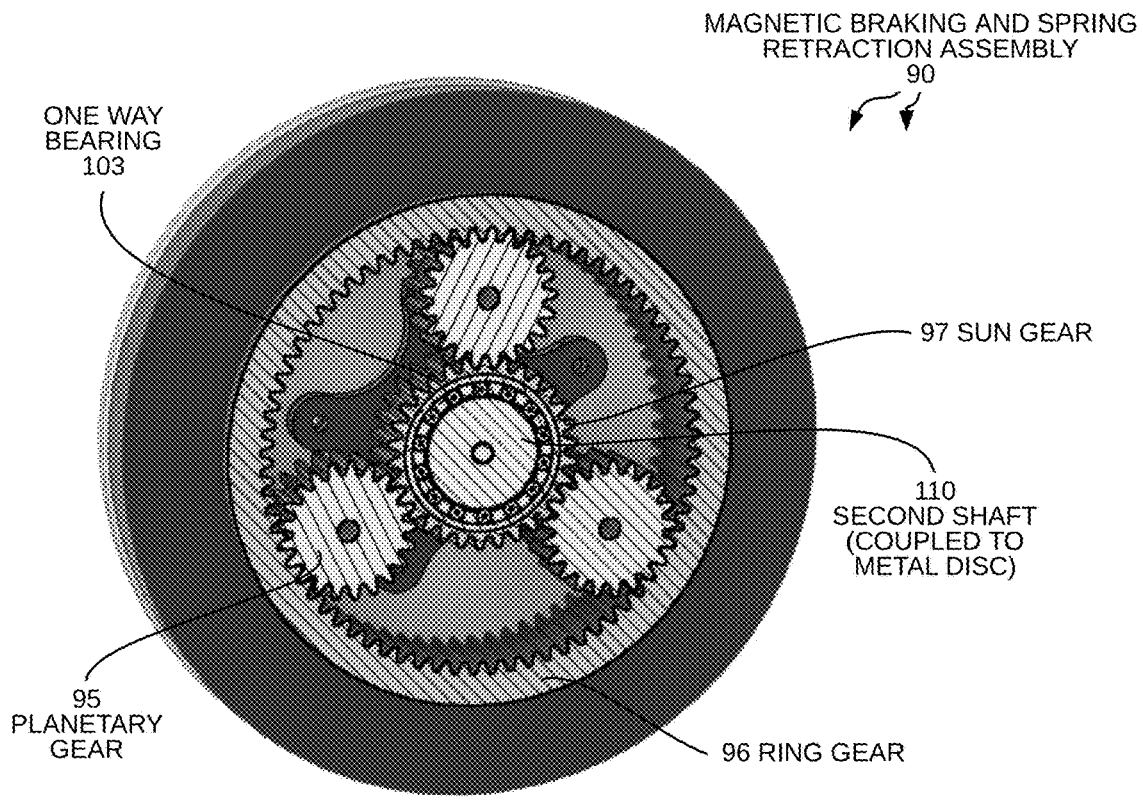
FIG. 23 is a cross-sectional perspective diagram of the magnetic braking and spring retraction assembly 90.

FIG. 23 is a cross-sectional perspective diagram of the magnetic braking and spring retraction assembly 90. FIG. 23 shows the sun gear 97 coupled to the second shaft 110 via the one way bearing 103. The metal disc 99 is not shown in FIG. 23.

Figure 24:
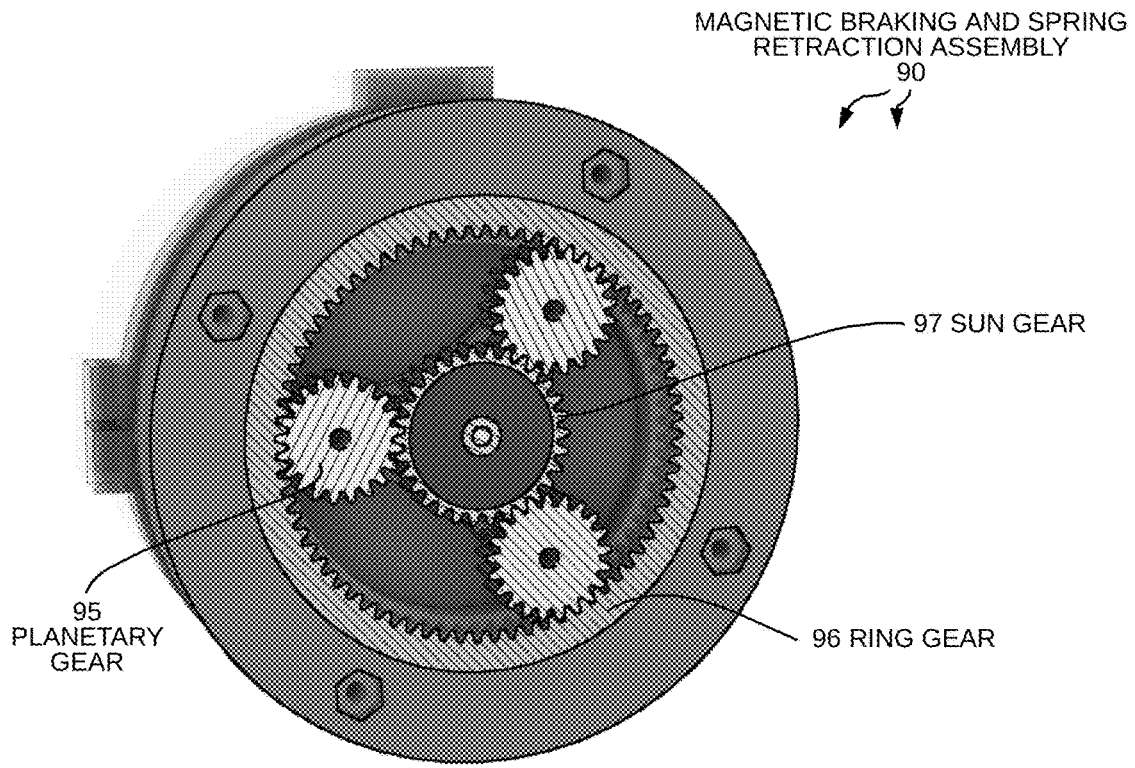
FIG. 24 is a cross-sectional perspective diagram of the magnetic braking and spring retraction assembly 90.

FIG. 24 is a cross-sectional perspective diagram of the magnetic braking and spring retraction assembly 90. FIG. 24 shows the planetary gears 95 coupled to the planetary carrier 94. The metal disc 99 is not shown in FIG. 24.

Figure 25:
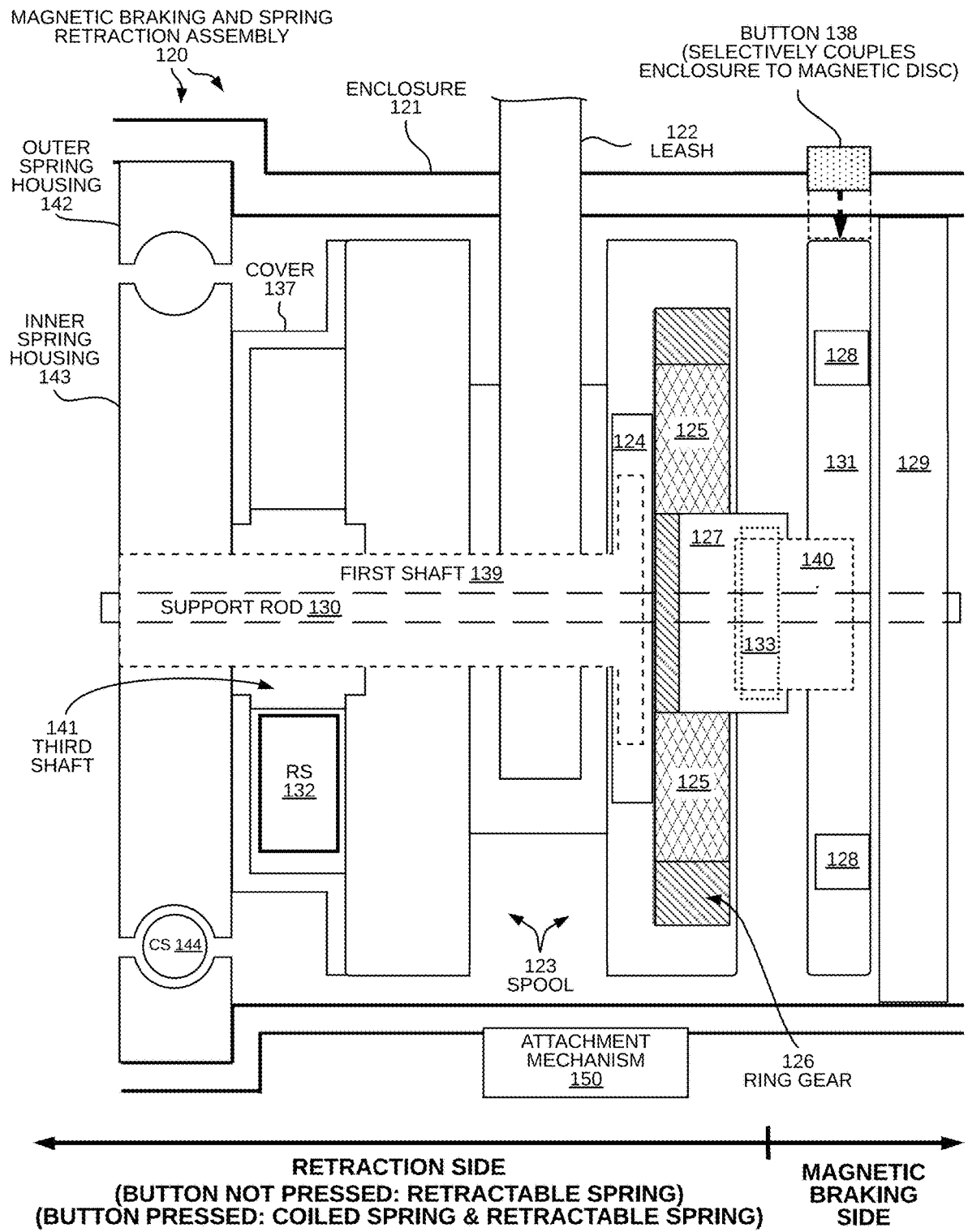
FIG. 25 is a cross sectional diagram of another embodiment of a magnetic braking and spring retraction assembly 120.

FIG. 25 is a cross sectional diagram of another embodiment of a magnetic braking and spring retraction assembly 120. In this embodiment, assembly 120 includes an enclosure 121, a leash 122, a spool 123, a planetary carrier 124, planetary gears 125, a ring gear 126, a one way bearing 133, a sun gear 127, a magnetic disc 131 with magnets 128, a metal disc 129, and a support rod 130. In this embodiment, ends of support rod 130 are coupled to the enclosure 121 such that the support rod 130 does not move or rotate. Furthermore, assembly 120 includes a first shaft 139, a second shaft 140, and a third shaft 141, making assembly 120 more robust.

Assembly 120 also includes a retractable spring 132, a cover 137, a coiled spring 144, an outer spring housing 142, and an inner spring housing 143. The use of multiple springs allows assembly 120 to withstand a heavier load on the leash.

The ring gear 126 and magnets 128 are disposed within the spool 123, thereby reducing costs relating to fabricating multiple components. The components of assembly 120 allow for a more compact enclosure 121 while still providing ample magnetic braking force.

Assembly 120 includes a button 138 coupled to enclosure 121. The button 138 is operable in a first state and a second state. In the first state, button 138 is not pressed. In the second state, button 138 is pressed (depressed). The addition of button 138 allows a user to set an amount of leash extendable from assembly 120. A more in-depth explanation regarding the operative components of assembly 120 is described in the detailed description below.

When button 138 is in the first state (not pressed), the magnetic disc 131 is not coupled to the enclosure 121. When the magnetic disc 131 is not coupled to the enclosure 121, assembly 120 is operable in a first operating mode and a second operating mode. In the first operating mode, the spool 123 is operable in a magnetic braking mode. In the second operating mode, the spool 123 is operable in a spring retracting mode.

In the first operating mode, as the leash extends away from the assembly 120, the spool 123 rotates in a counterclockwise direction. The ring gear 126 disposed within the spool 123 rotates in a counterclockwise direction. The ring gear 126 causes each planetary gear 125 to rotate in a counterclockwise direction. The planetary gears 125 do not revolve around the sun gear 127. Rather, the planetary gears 125 drive the sun gear 127 such that the sun gear 127 rotates in the clockwise direction. The sun gear 127 is coupled to the second shaft 140 via the one way bearing 133.

In another embodiment, the second shaft 140 is coupled to the support rod 130 via the one way bearing 133. In the embodiment where the second shaft 140 is coupled to the support rod 130 via the one way bearing 133, the sun gear 127 is coupled to the support rod 130. Additionally, ends of the support rod 130 are coupled to the enclosure 121 via washers. Coupling the support rod 130 to the enclosure 121 prevents the support rod 130 from moving laterally while still allowing the support rod 130 to rotate radially. The addition of washers reduces damage caused to the enclosure 121 due to the rotating support rod 130. When the sun gear 127 rotates in the clockwise direction, the sun gear 127 drives support rod 130 causing the one way bearing 133 to lock to the support rod 130. Because the second shaft 140 is coupled to the one way bearing 133, the second shaft 140 also rotates in the clockwise direction in the first operating mode.

In the magnetic braking mode, the one way bearing 133 locks to the second shaft 140 which is coupled to the magnetic disc 131. The magnets 128 disposed in the magnetic disc 131 rotate counterclockwise. The static metal disc 129 exerts a drag force (magnetic braking force) on each of the magnets 128 moving with the rotating magnetic disc 131.

In the magnetic braking mode, the retractable spring 132 is compressing while the coiled spring 144 remains static. The coiled spring 144 remains static because the planetary carrier 124 is not rotating.

When the spool 123 is operable in the spring retracting mode, the retractable spring 132 decompresses and applies rotational force on the spool 123, causing the spool 123 to rotate in a clockwise direction. The ring gear 126 is disposed within the spool 123 and rotates in a clockwise direction. The ring gear 126 causes each planetary gear 125 to rotate in a clockwise direction. Importantly, the planetary gears 125 do not revolve around the sun gear 127. Since the planetary gears 125 coupled to the planetary carrier 124 are not revolving, the planetary carrier 124 remains static and does not drive the first shaft 139. The third shaft 141 and the coiled spring remain static.

The planetary gears 125 drive the sun gear 127 in the counterclockwise direction. The sun gear 127 is coupled to the second shaft 140 via the one way bearing 133. In the spring retracting mode, as the sun gear 127 rotates counter clockwise, the one way bearing freewheels in the counterclockwise direction. The second shaft 140 and magnetic disc 131 are static and are not being driven by the one way bearing. In other words, the magnetic braking side of the assembly 120 is disengaged and no magnetic braking force is generated when the leash 122 is retracting.

When button 138 is in the second state (pressed/depressed), the magnetic disc 131 is coupled to the enclosure 121 via the button 138. When the magnetic disc 131 is coupled to the enclosure 121, assembly 120 is operable in a third operating mode and a fourth operating mode. In the third operating mode, the spool 123 is operable in a limited magnetic braking mode. In the fourth operating mode, the spool 123 is operable in a spring retracting mode.

In the third operating mode, the magnetic disc 131 and the second shaft 140 are static. As a result, the one way bearing 133 and the sun gear 127 are static. When the leash extends away from the assembly 120, the spool 123 rotates in a counterclockwise direction. The ring gear 126 is disposed within the spool 123 and rotates in a counterclockwise direction. The ring gear 126 causes each planetary gear 125 to rotate in a counterclockwise direction. The planetary gears 125 revolve in a counterclockwise direction around the sun gear 127. The planetary gears 125 coupled to the planetary carrier 124 and cause the planetary carrier 124 to rotate in a counterclockwise direction. The first shaft 139 is coupled to the planetary carrier 124 and drives the third shaft 141 in the counterclockwise direction.

In the third operating mode, the coiled spring 144 is compressing. While the coiled spring 144 is compressing, the spool 123 rotates in a counterclockwise direction. Once the coiled spring 144 is fully compressed, the coiled spring 144 prevents the spool 123 from further rotating in the counterclockwise direction.

Importantly, in the third operating mode, no magnetic braking occurs because the magnetic disc 131 is static.

One novel aspect of the assembly 120 is that the spool 123 is operable in the spring retracting mode even when button 138 is in the second state (pressed/depressed). In other words, the assembly 120 is operable in the fourth operating mode.

In the fourth operable mode, the magnetic disc 131 and the second shaft 140 are static. As a result, the one way bearing 133 and the sun gear 127 are static. In the fourth operating mode, the coiled spring 144 is decompressing and applies rotational force in the clockwise direction. The retractable spring 132 is also decompressing and applies rotational force in the clockwise direction.

The planetary carrier 124 rotates in the clockwise direction and drives the planetary gears 125 to rotate in a clockwise direction. Since the sun gear 127 is static, as the planetary gears 125 drive the ring gear 126 in the clockwise direction while revolving around the sun gear 127. As a result, the spool 123 rotates in the clockwise direction, retracting the leash towards the assembly.

FIG. 26 is a table 530 in accordance with one novel aspect.

Figure 27:
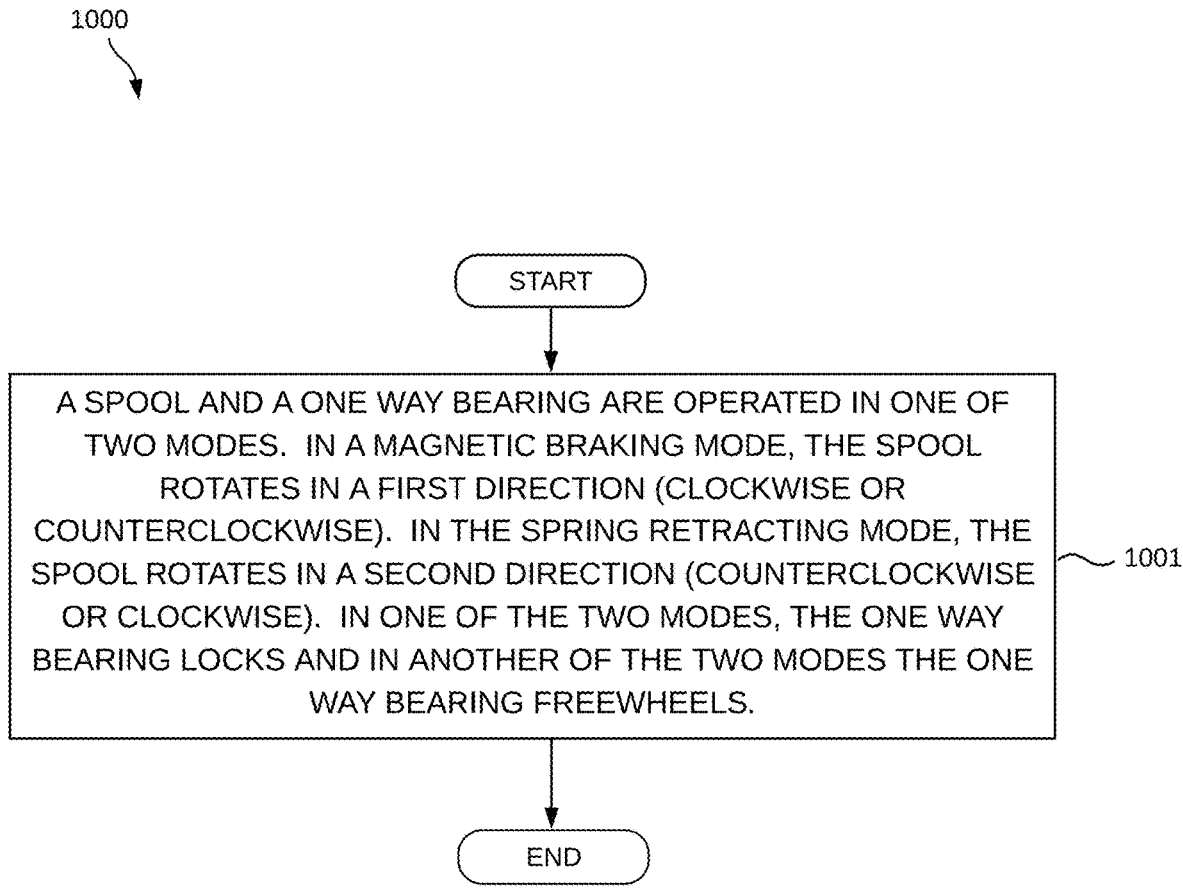
FIG. 27 is a flowchart of a method 1000 in accordance with one novel aspect.

FIG. 27 is a flowchart of a method 1000 in accordance with one novel aspect. In a first step (step 1001), a spool and a one way bearing are operated in one of two modes. In a magnetic braking mode, the spool rotates in a first direction (clockwise or counterclockwise). In the spring retracting mode, the spool rotates in a second direction (counterclockwise or clockwise). In one of the two modes, the one way bearing locks and in another of the two modes the one way bearing freewheels.

Figure 28:
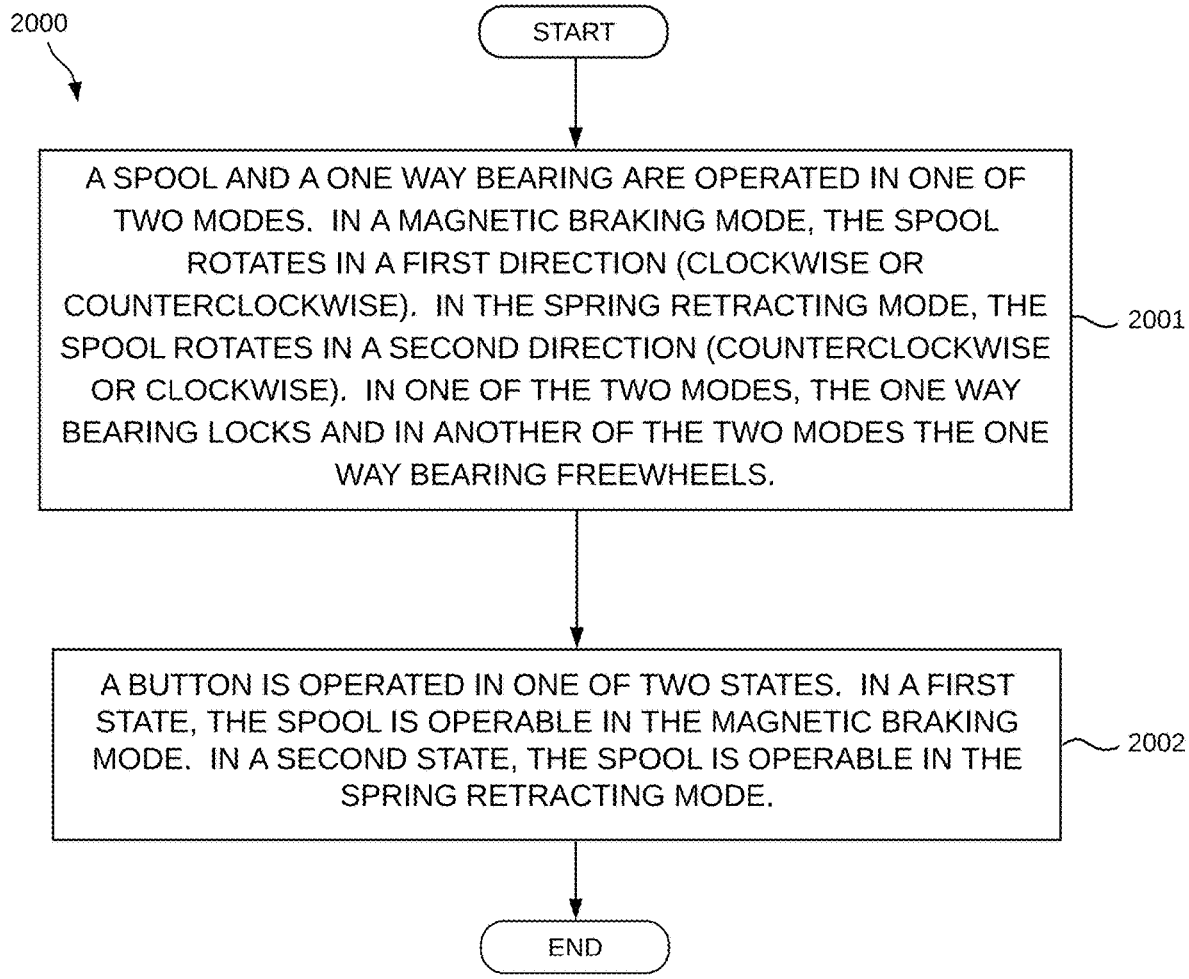
FIG. 28 is a flowchart of a method 2000 in accordance with another novel aspect.

FIG. 28 is a flowchart of a method 2000 in accordance with another novel aspect. In a first step (step 2001), a spool and a one way bearing are operated in one of two modes. In a magnetic braking mode, the spool rotates in a first direction (clockwise or counterclockwise). In the spring retracting mode, the spool rotates in a second direction (counterclockwise or clockwise). In one of the two modes, the one way bearing locks and in another of the two modes the one way bearing freewheels. In a second step (step 2002), a button is operated in one of two states. In a first state, the spool is operable in the magnetic braking mode. In a second state, the spool is operable in the spring retracting mode.

Figure 29:
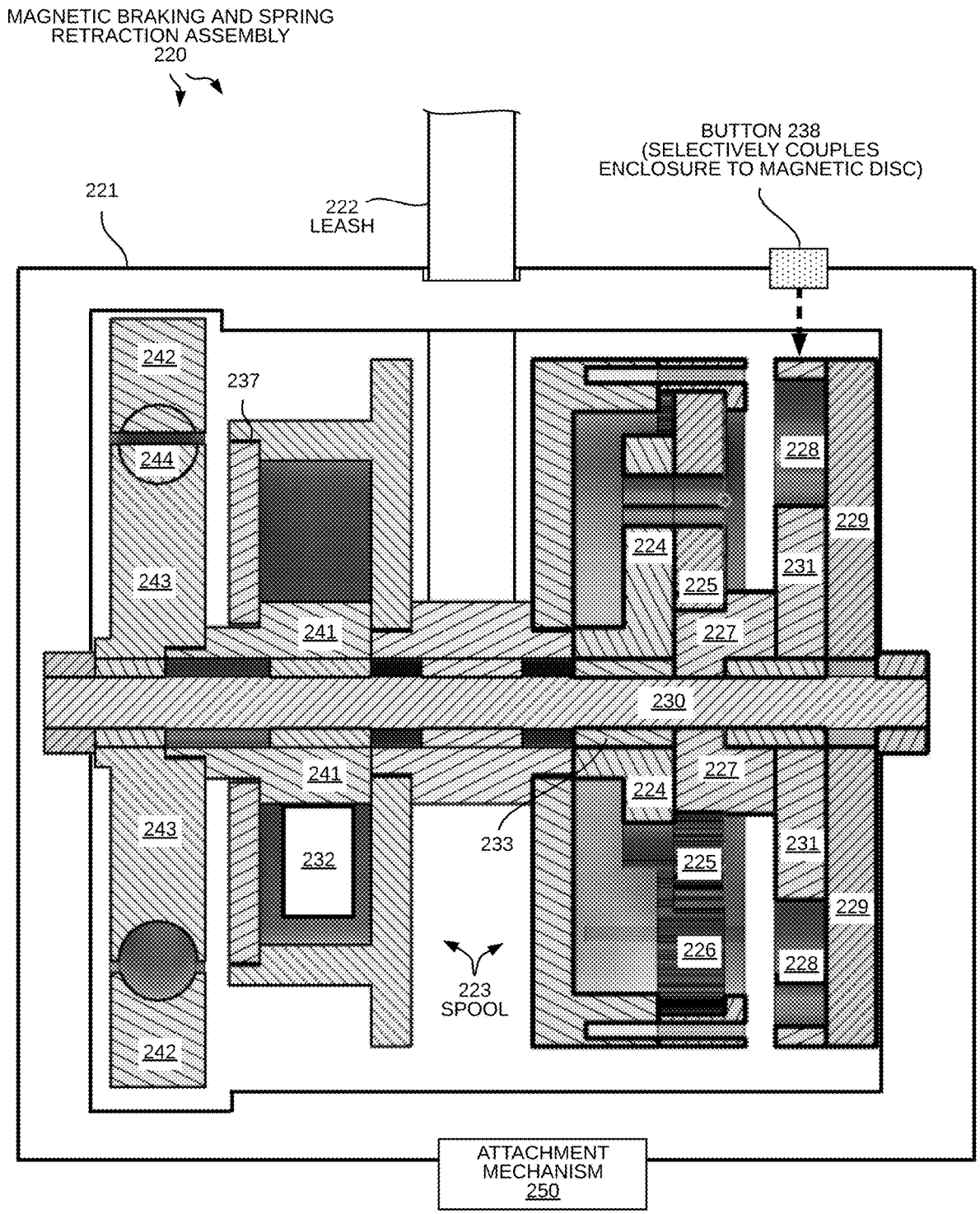
FIG. 29 is a cross sectional diagram of another embodiment of a magnetic braking and spring retraction assembly 220.

FIG. 29 is a cross sectional diagram of another embodiment of a magnetic braking and spring retraction assembly 220. In this embodiment, assembly 220 includes an enclosure 221, a leash 222, a spool 223, a planetary carrier 224, planetary gears 225, a ring gear 226, a one way bearing 233, a sun gear 227, a magnetic disc 231 with magnets 228, a metal disc 229, and a support rod 230.

In this embodiment, ends of support rod 230 are coupled to the enclosure 221 via freewheeling bearings. A freewheeling bearing is a bearing that does not lock when rotating in a clockwise or counterclockwise direction (e.g. nylon washer). Coupling the support rod 230 to the enclosure 221 prevents the support rod 230 from moving laterally while still allowing the support rod 230 to rotate radially. The addition of bearings reduces damage caused to the enclosure 221 due to the rotating support rod 230.

In another embodiment, ends of the support rod 220 are coupled to the enclosure 221 such that the support rod 230 does not move or rotate.

In the embodiment shown in FIG. 29, assembly 220 includes a retractable spring 232, a cover 237, a coiled spring shaft 241, an outer spring housing 242, and an inner spring housing 243, and a coiled spring 244. The use of multiple springs allows for an additional mode of damping via the coiled spring 244. The inner spring housing 243 is coupled to the support rod 230 and is coupled to the coiled spring shaft 241. Coiled spring shaft 241 is coupled to spool 223 via the retracting spring 232.

The ring gear 226 is coupled to the spool 223. The ring gear 226 is not directly coupled to the enclosure 221 or support rod 230.

The sun gear 227 is coupled to the magnetic disc 231. The magnetic disc 231 contains a plurality of holes in which may or may not contain magnets 228. The strength of the magnetic braking force is adjustable and depends on the number and size of magnets 228 contained in the magnetic disc 231.

Assembly 220 includes a button 238 coupled to enclosure 221. The button 238 is operable in a first state and a second state. In the first state, button 238 is not pressed. In the second state, button 238 is pressed (depressed). The addition of button 238 allows a user to set an amount of leash extendable from assembly 220. For example, when button 238 is depressed the rotation speed of magnetic disc 231 is slowed. In another example, when button 238 is depressed the magnetic disc 231 is stopped from rotating.

When button 238 is in the first state (not pressed), the magnetic disc 231 is not coupled to the enclosure 221. When the magnetic disc 231 is not coupled to the enclosure 221, assembly 220 is operable in a first operating mode and a second operating mode. In the first operating mode, the spool 223 is operable in a magnetic braking mode. In the second operating mode, the spool 223 is operable in a spring retracting mode.

In the first operating mode, as the leash extends away from the assembly 220, the spool 223 rotates in a counterclockwise direction. The retractable spring 232 is compressing as the spool 223 rotates counterclockwise. The coiled spring 244 and the coiled spring shaft 241 remain static. The coiled spring 244 is coupled to the support rod 230 and the support rod 230 is coupled to the one way bearing 233. The tension of coiled spring 244 prevents the support rod 230 and planetary carrier 224 from rotating in a counterclockwise direction.

The ring gear 226, which is coupled to the spool 223, rotates in a counterclockwise direction. The ring gear 226 causes each of the planetary gears 225 to rotate in a counterclockwise direction. The planetary gears 225 do not revolve around the sun gear 227 because the planetary carrier 224 is prevented from rotating in a counterclockwise direction. Rather, planetary gears 225 drive the sun gear 227 such that the sun gear 227 rotates in the clockwise direction. The sun gear 227 is coupled to the magnetic disc 231. The magnetic disc 231, which contains magnets 228, rotates in the clockwise direction. The static metal disc 229 and each of the magnets 228 generate eddy currents which creates a drag force (magnetic braking force). The strength of the magnetic braking force can be calibrated based on the number of magnets 228 that are disposed within the magnetic disc 231.

In the second operating mode, the spool 223 is operable in the spring retracting mode. When the spool 223 is operable in the spring retracting mode, the retractable spring 232 decompresses and applies rotational force on the spool 223, causing the spool 223 and ring gear 226 to rotate in a clockwise direction. The ring gear 226 drives the planetary carrier 224 in the clockwise direction. The sun gear 227 is not being driven and will either be static or idle in a clockwise direction. The planetary carrier 224 is allowed to freely revolve clockwise due to the one way bearing 233 freewheeling in the clockwise direction. As a result, any eddy currents created by the rotation of the magnetic disc 231 will not cause magnetic braking to the ring gear 226 or spool 223.

When button 238 is in the second state (pressed/depressed), the magnetic disc 231 is coupled to the enclosure 221 via the button 238. When the magnetic disc 231 is coupled to the enclosure 221, assembly 220 is operable in a third operating mode and a fourth operating mode. In the third operating mode and the fourth operating mode, no magnetic braking occurs because the magnetic disc 231 and sun gear 227 are static.

In the third operating mode, the magnetic disc 231 and sun gear 227 are static. When the leash 222 extends away from the assembly 220, the spool 223 rotates in a counterclockwise direction. The ring gear 226, which is coupled to the spool 223, rotates in a counterclockwise direction. The ring gear 226 causes each of the planetary gears 225 to rotate in a counterclockwise direction. Each of the planetary gears 225 revolve in a counterclockwise direction around the sun gear 227, due to the sun gear 227 being static. The planetary gears 225 are coupled to the planetary carrier 224 and cause the planetary carrier 224 to rotate in a counterclockwise direction. The planetary carrier 224 is coupled to the one way bearing 233, which locks to the support rod 230 in the counterclockwise direction. The support rod 230 is directly coupled to the inner spring housing 243. Rotating the support rod 230 in the counterclockwise direction causes the coiled spring 244 to compress. Once the coiled spring 244 is fully compressed, the coiled spring 244 prevents the spool 223 from further rotating in the counterclockwise direction.

Importantly, in the third operating mode, no magnetic braking occurs because the magnetic disc 231 is static.

In the fourth operating mode, the magnetic disc 231 and sun gear 227 are static. The coiled spring 244 decompresses and applies rotational force in the clockwise direction. Since the coiled spring 244 is applying clockwise rotational force on the inner spring housing 243, the inner spring housing 243 drives the coiled spring shaft 241 and the support rod 230 to rotate clockwise. When the support rod 230 rotates in the clockwise direction, tension from the coiled spring 244 is applied to the one way bearing 233, locking the support rod 230 to the one way bearing 233. The one way bearing 233 drives the planetary carrier 224 in the clockwise direction. The planetary gears 225 revolve around sun gear 227 in a clockwise direction causing the spool 223 to rotate in the clockwise direction, retracting the leash 222 towards the assembly. The retractable spring 232 is also decompressing and applies rotational force on the spool 223 in the clockwise direction. Once the coiled spring 244 is fully decompressed, the retractable spring 232 takes over in applying rotation force on the spool 223.

Although certain specific embodiments are described above for instructional purposes, the teachings of this patent document have general applicability and are not limited to the specific embodiments described above.

For example, the size and number of planet gears, magnets, and/or magnetic discs can be altered and/or optimized. In another example, another mechanism besides a button is used to couple components to the enclosure. In yet another example, an enclosure of an assembly includes an attachment mechanism. In one example, the attachment mechanism is a belt loop. See FIG. 25 attachment mechanism 150. In another example, the attachment mechanism can be coupled to other objects (e.g. a stake in the ground).

Accordingly, various modifications, adaptations, and combinations of various features of the described embodiments can be practiced without departing from the scope of the invention as set forth in the claims.

What is claimed is:

1. An apparatus comprising:
a one way bearing;
a spool operable in two modes that include a magnetic braking mode and a spring retracting mode, wherein in the magnetic braking mode the spool rotates in a first direction, wherein in the spring retracting mode the spool rotates in a second direction, and wherein in one of the two modes the one way bearing locks and in another of the two modes the one way bearing freewheels;
a rod;
an enclosure, wherein the rod, the spool, and the one way bearing are disposed within the enclosure;
a planetary carrier;
a plurality of planetary gears;
a sun gear;
a ring gear; and
a magnetic disc.

2. The apparatus of claim 1, wherein one of the spool, the planetary carrier, or the sun gear couples to the rod via the one way bearing.

3. The apparatus of claim 1, wherein the ring gear is disposed within the spool.

4. The apparatus of claim 1, further comprising:
a button, wherein the button is in one of two states, wherein in one of the two states, the spool is operable in the magnetic braking mode, and in another of the two states the spool is operable in the spring retracting mode.

5. The apparatus of claim 4, wherein when the button is in one of two states, the magnetic braking mode is disabled.

6. The apparatus of claim 4, further comprising:
a coiled spring, wherein when the button is in one of two states, the coiled spring limits rotation of the spool in the first direction.

7. The apparatus of claim 1, wherein the rod rotates only when in the magnetic braking mode.

8. A method comprising:
controlling a spool and a one way bearing in one of two modes, wherein the two modes include a magnetic braking mode and a spring retracting mode, wherein in the magnetic braking mode the spool rotates in a first direction, wherein in the spring retracting mode, the spool rotates in a second direction, and wherein in one of the two modes the one way bearing locks and in another of the two modes the one way bearing freewheels, wherein the spool and the one way bearing are parts of a magnetic braking and spring retraction assembly, wherein the magnetic braking and spring retraction assembly includes an enclosure and a rod, and wherein the rod, the spool, and the one way bearing are disposed within the enclosure, wherein the magnetic braking and spring retraction assembly further comprises:
a planetary carrier;
a plurality of planetary gears;
a sun gear;
a ring gear; and
a magnetic disc.

9. The method of claim 8, wherein the ring gear is disposed within the spool.

10. The method of claim 8, wherein the rod rotates only when in the magnetic braking mode.

11. A method comprising:
controlling a spool and a one way bearing in one of two modes, wherein the two modes include a magnetic braking mode and a spring retracting mode, wherein in the magnetic braking mode the spool rotates in a first direction, wherein in the spring retracting mode, the spool rotates in a second direction, and wherein in one of the two modes the one way bearing locks and in another of the two modes the one way bearing freewheels, wherein the spool and the one way bearing are parts of a magnetic braking and spring retraction assembly, wherein the magnetic braking and spring retraction assembly includes an enclosure and a rod, and wherein the rod, the spool, and the one way bearing are disposed within the enclosure, wherein one of the spool, a planetary carrier, or a sun gear couples to the rod via the one way bearing.

12. A method comprising:
controlling a spool and a one way bearing in one of two modes, wherein the two modes include a magnetic braking mode and a spring retracting mode, wherein in the magnetic braking mode the spool rotates in a first direction, wherein in the spring retracting mode, the spool rotates in a second direction, and wherein in one of the two modes the one way bearing locks and in another of the two modes the one way bearing freewheels, wherein the spool and the one way bearing are parts of a magnetic braking and spring retraction assembly, wherein the magnetic braking and spring retraction assembly includes an enclosure and a rod, and wherein the rod, the spool, and the one way bearing are disposed within the enclosure; and operating a button in one of two states, wherein in one of the two states, the spool is operable in the magnetic braking mode, and in another of the two states the spool is operable in the spring retracting mode.

13. The method of claim 12, wherein when the button is in one of the two states, the magnetic braking mode is disabled.

14. The method of claim 12, wherein when the button is in one of the two states, a coiled spring limits rotation of the spool in the first direction.

* * * * *